United States Patent
Tomizawa et al.

(10) Patent No.: US 12,431,292 B2
(45) Date of Patent: Sep. 30, 2025

(54) MULTILAYER CERAMIC ELECTRONIC COMPONENT WITH UNEVEN REGION BETWEEN EXTERNAL ELECTRODES

(71) Applicant: TAIYO YUDEN CO., LTD., Tokyo (JP)

(72) Inventors: Yuji Tomizawa, Tokyo (JP); Yasutomo Suga, Tokyo (JP); Yasunari Kato, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 109 days.

(21) Appl. No.: 18/188,240

(22) Filed: Mar. 22, 2023

(65) Prior Publication Data

US 2023/0335340 A1    Oct. 19, 2023

(30) Foreign Application Priority Data

Apr. 18, 2022   (JP) ................... 2022-068047

(51) Int. Cl.
| | |
|---|---|
| H01G 4/232 | (2006.01) |
| H01G 2/06 | (2006.01) |
| H01G 4/224 | (2006.01) |
| H01G 4/30 | (2006.01) |

(52) U.S. Cl.
CPC ............. *H01G 4/232* (2013.01); *H01G 2/06* (2013.01); *H01G 4/224* (2013.01); *H01G 4/30* (2013.01)

(58) Field of Classification Search
CPC .......... H01G 2/06; H01G 4/224; H01G 4/30; H01G 4/232
See application file for complete search history.

(56) References Cited

U.S. PATENT DOCUMENTS

| | | | |
|---|---|---|---|
| 2017/0345566 A1* | 11/2017 | Tanaka | ................ C23C 14/185 |
| 2021/0183574 A1 | 6/2021 | Yatagawa et al. | |
| 2021/0327647 A1* | 10/2021 | Kim | ................ H01G 4/012 |

FOREIGN PATENT DOCUMENTS

| | | | | |
|---|---|---|---|---|
| CN | 205159107 U | * | 4/2016 | |
| JP | S64018722 U | * | 1/1989 | |
| JP | 11040456 A | * | 2/1999 | ............. H01G 4/12 |
| JP | 2004153098 A | * | 5/2004 | |
| JP | 2021-097078 A | | 6/2021 | |
| KR | 19980030876 U | * | 8/1998 | |

* cited by examiner

*Primary Examiner* — David M Sinclair
(74) *Attorney, Agent, or Firm* — CHEN YOSHIMURA LLP

(57) ABSTRACT

A multilayer ceramic electronic component includes a ceramic body, and first and second external electrodes facing each other in a second axis direction. The ceramic body includes internal electrodes, and has a rectangular parallelepiped shape having first and second end surfaces, and four connection surfaces each connecting the first and second end surfaces. The connection surface has an uneven region located between the first and second external electrodes. The uneven region includes recess portions formed along an extension direction intersecting the second axis direction and arranged along an arrangement direction orthogonal to a depth direction and the extension direction, and a protrusion portion located between the recess portions. A depth of the recess portion in the depth direction is 0.1 μm or greater and less than 2.5 μm. An arrangement pitch of the recess portions along the arrangement direction is 1 μm or greater and 80 μm or less.

15 Claims, 25 Drawing Sheets

MULTILAYER CERAMIC ELECTRONIC COMPONENT WITH UNEVEN REGION BETWEEN EXTERNAL ELECTRODES

FIELD

A certain aspect of the present disclosure relates to a multilayer ceramic electronic component, a circuit board, and a method of manufacturing a multilayer ceramic electronic component.

BACKGROUND

A multilayer ceramic electronic component such as a multilayer ceramic capacitor includes, for example, a ceramic body, and first and second external electrodes disposed on respective ends of the ceramic body. When a leakage current is generated in the ceramic body, the insulation resistance between these external electrodes decreases, and the multilayer ceramic electronic component is more likely to fail.

For example, in a high-temperature and high-humidity environment, dew condensation may occur on the surface of the multilayer ceramic electronic component, thereby generating a leakage current on the surface of the ceramic body. Japanese Patent Application Laid-Open No. 2021-097078 (Patent Document 1) discloses a technique of providing a water repellent agent on the surface of the multilayer ceramic electronic component.

RELATED ART DOCUMENTS

Patent Documents

Japanese Patent Application Laid-Open No. 2021-097078

SUMMARY

However, in the technique described in Patent Document 1, it is necessary to mask the external electrodes when applying the water repellent agent, and the process may be complicated particularly for small-sized multilayer ceramic electronic components. Therefore, there is a demand for a technique capable of improving the reliability of a multilayer ceramic electronic component by a method that is simpler and suitable for small-sized multilayer ceramic electronic components.

An object of the present disclosure provides a multilayer ceramic electronic component capable of improving reliability, a circuit board on which the multilayer ceramic electronic component is mounted, and a method of manufacturing the multilayer ceramic electronic component.

In one aspect of the present disclosure, there is provided a multilayer ceramic electronic component including: a ceramic body that includes a plurality of internal electrodes stacked in a direction of a first axis with ceramic layers interposed therebetween, and has a rectangular parallelepiped shape having first and second end surfaces perpendicular to a second axis orthogonal to the direction of the first axis, and four connection surfaces each connecting the first and second end surfaces and extending along a direction of the second axis, the plurality of internal electrodes being alternately led out to the first and second end surfaces; and first and second external electrodes disposed on the first and second end surfaces, respectively, and opposed to each other in the direction of the second axis, wherein at least one connection surface of the connection surfaces has an uneven region located between the first and second external electrodes, the uneven region includes: a plurality of recess portions that are formed along an extension direction intersecting the second axis, recessed in a depth direction orthogonal to the second axis and the extension direction, and arranged along an arrangement direction orthogonal to the depth direction and the extension direction, and a protrusion portion disposed between the plurality of recess portions, a depth of each of the recess portions in the depth direction is 0.1 μm or greater and less than 2.5 μm, and an arrangement pitch of the recess portions along the arrangement direction is 1 μm or greater and 80 μm or less.

In this configuration, since the plurality of recess portions and protrusion portions are formed along the extension direction intersecting with the second axis, it is possible to increase the distance between the first and second external electrodes along the connection surface. As a result, a leakage current or the like due to migration can be reduced, and a decrease in insulation resistance of the multilayer ceramic electronic component can be reduced. In addition, when the depth of the recess portion is adjusted to be 0.1 μm or greater and less than 2.5 μm and the arrangement pitch of the recess portions is adjusted to be 1 μm or greater and 80 μm or less, defects such as cracking and chipping in the uneven region can be inhibited. Therefore, the reliability of the multilayer ceramic electronic component can be improved.

A ratio of the arrangement pitch of the recess portions to the depth of each of the recess portions may be 0.41 or greater and 700 or less.

This configuration sufficiently forms the unevenness due to the recess portions and the protrusion portions, and more reliably inhibits defects such as cracking and chipping in the uneven region.

From the same viewpoint, a ratio of the arrangement pitch of the recess portions to the depth of each of the recess portions may be 2.5 or greater and 80 or less.

A dimension in the direction of the first axis of the multilayer ceramic electronic component may be 110 μm or less.

This configuration can make the multilayer ceramic electronic component thin.

For example, at least one of the at least one connection surface having the uneven region may extend along the direction of the second axis and a third axis direction orthogonal to the first axis and the second axis.

For example, at least one of the at least one connection surface having the uneven region may include a pair of electrode-forming regions covered with the first and second external electrodes, and an intermediate region between the pair of electrode-forming regions, and the uneven region may be formed only in the intermediate region.

Since the uneven region is not formed in the electrode-forming region, it is possible to flatten the external electrode and to inhibit a problem during mounting.

Each of the first and second external electrodes may include a conductive thin film, and a plating film formed on the conductive thin film.

By using the conductive thin film as a base for the plating film, the external electrode can be easily formed to be thin.

Specifically, the conductive thin film may have a thickness of 1.0 μm or less.

The conductive thin film may be formed of a sputtered film.

For example, the extension direction of each of the recess portions may be a direction orthogonal to the second axis.

Alternatively, the extension direction of each of the recess portions may be a direction intersecting with the second axis at an acute angle.

For example, an arithmetic average height Sa of each of the recess portions and the protrusion portion may be 1.0 μm or less.

For example, a maximum height Sz of each of the recess portions and the protrusion portion may be 5.0 μm or less.

These configurations can smooth the recess portions and the protrusion portions, and can more reliably inhibit cracking and chipping of the ceramic body.

For example, an absolute value of a difference between an arithmetic average height Sa of each of the recess portions and an arithmetic average height Sa of the protrusion portion may be 0.06 μm or less.

For example, an absolute value of a difference between a maximum height Sz of each of the recess portions and a maximum height Sz of the protrusion portion may be 4.0 μm or less.

In another aspect of the present disclosure, there is provided a circuit board including: a multilayer ceramic electronic component; and a mounting substrate on which the multilayer ceramic electronic component is mounted; wherein the multilayer ceramic electronic component includes: a ceramic body that includes a plurality of internal electrodes stacked in a direction of a first axis with ceramic layers interposed therebetween, and has a rectangular parallelepiped shape having first and second end surfaces perpendicular to a second axis orthogonal to the direction of the first axis, and four connection surfaces each connecting the first and second end surfaces and extending along a direction of the second axis, the plurality of internal electrodes being alternately led out to the first and second end surfaces, and first and second external electrodes disposed on the first and second end surfaces, respectively, and opposed to each other in the direction of the second axis, at least one connection surface of the connection surfaces has an uneven region located between the first and second external electrodes, the uneven region includes: a plurality of recess portions that are formed along an extension direction intersecting the second axis, recessed in a depth direction orthogonal to the second axis and the extension direction, and arranged along an arrangement direction orthogonal to the depth direction and the extension direction, and a protrusion portion disposed between the plurality of recess portions, a depth of each of the recess portions in the depth direction is 0.1 μm or greater and less than 2.5 μm, and an arrangement pitch of the recess portions along the arrangement direction is 1 μm or greater and 80 μm or less.

In another aspect of the present disclosure, there is provided a method of manufacturing a multilayer ceramic electronic component, the method including: forming an unfired ceramic body that includes a plurality of internal electrodes stacked in a direction of a first axis with ceramic layers interposed therebetween, and has a rectangular parallelepiped shape having first and second end surfaces perpendicular to a second axis orthogonal to the direction of the first axis, and four connection surfaces each connecting the first and second end surfaces and extending along a direction of the second axis, the plurality of internal electrodes being alternately led out to the first and second end surfaces; firing the unfired ceramic body to obtained a fired ceramic body; forming conductive thin films on at least one connection surface of the four connection surfaces and the first and second end surfaces of the fired ceramic body; and irradiating the conductive thin film on the at least one connection surface with a short-pulse laser along a scanning direction intersecting the second axis to remove the conductive thin film and form a recess portion on the at least one connection surface along the scanning direction.

BRIEF DESCRIPTION OF THE DRAWINGS

FIG. 14A presents the values of an arithmetic average height Sa and FIG. 14B presents the values of a maximum height Sz;

DETAILED DESCRIPTION

Figure 1:
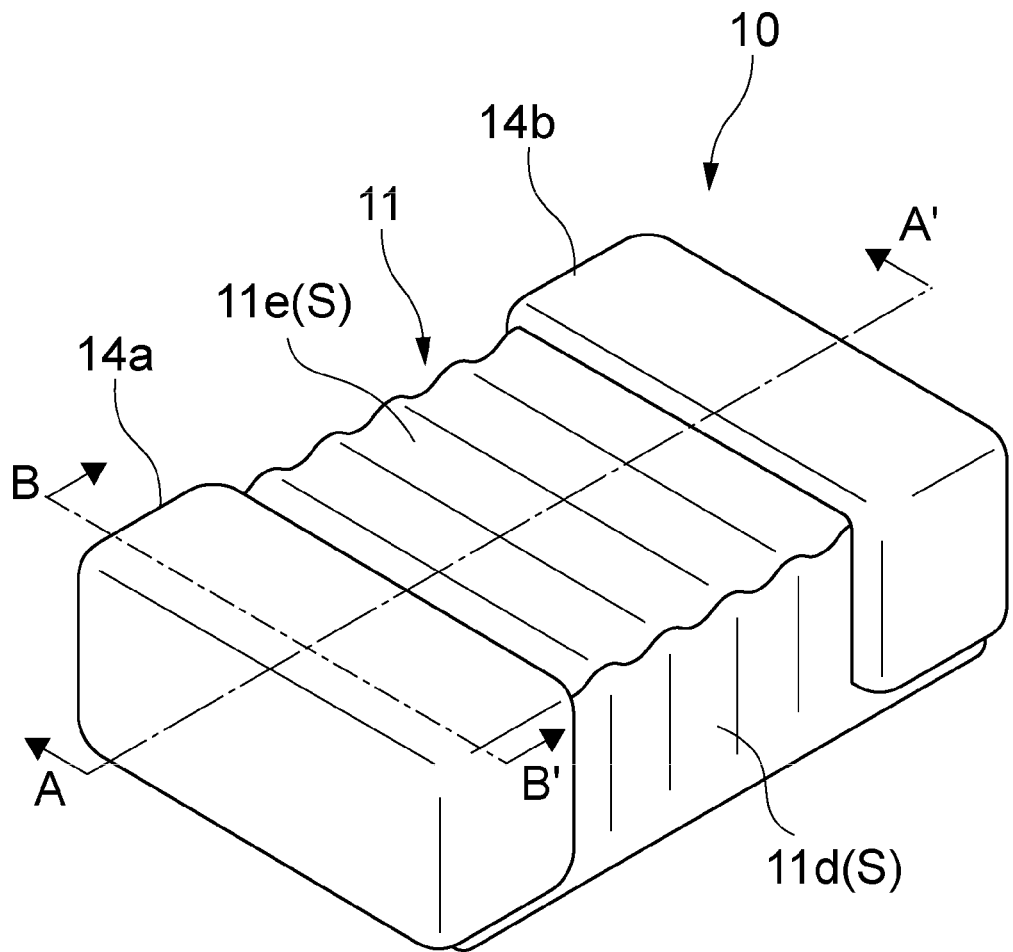
FIG. 1 illustrates a multilayer ceramic capacitor in accordance with a first embodiment.
Figure 1:
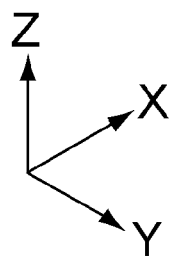

Hereinafter, embodiments of the present disclosure will be described with reference to the drawings. In the drawings, an X-axis, a Y-axis, and a Z-axis that are orthogonal to each other are illustrated as appropriate. The X-axis, the Y-axis, and the Z-axis define a fixed coordinate system with respect to a multilayer ceramic capacitor.

First Embodiment

Overall Configuration of a Multilayer Ceramic Capacitor

Figure 2:
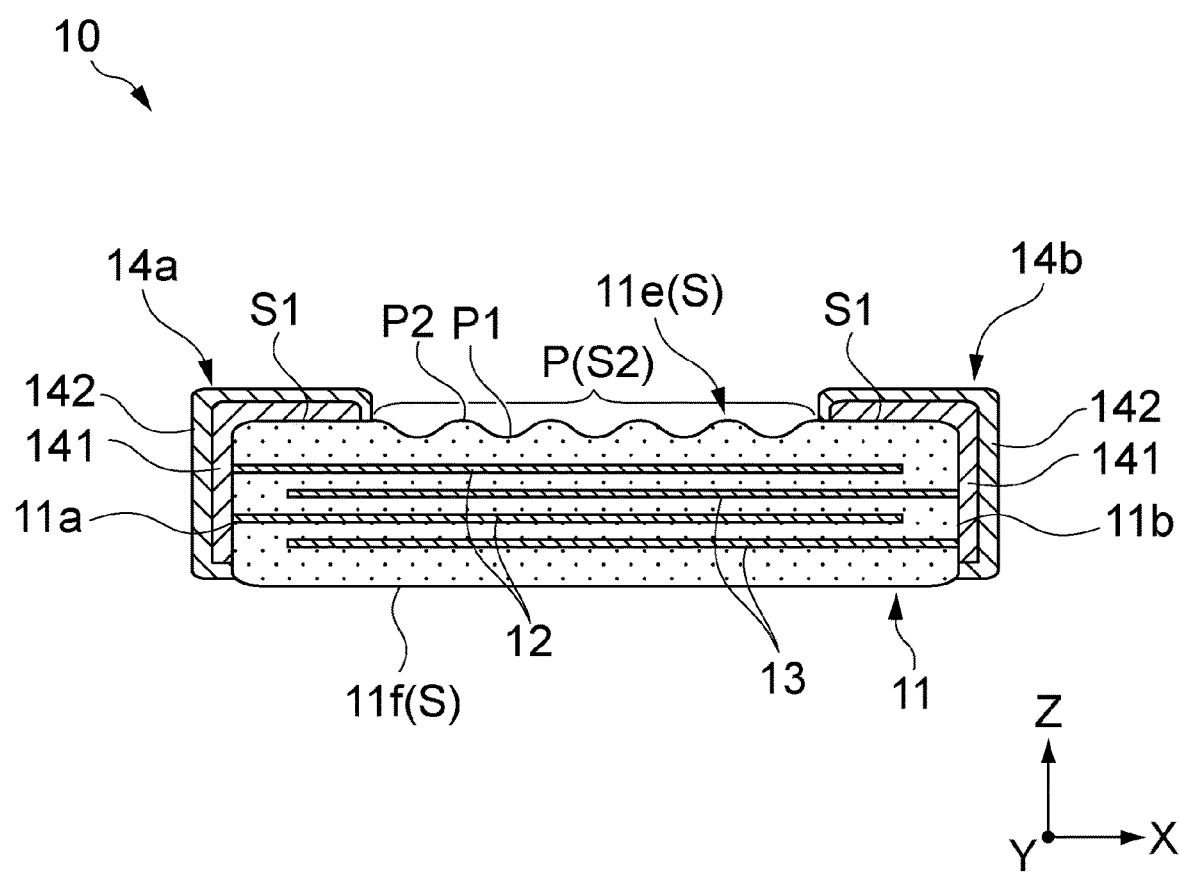
FIG. 2 is a cross-sectional view of the multilayer ceramic capacitor taken along line A-A' in FIG. 1.
Figure 3:
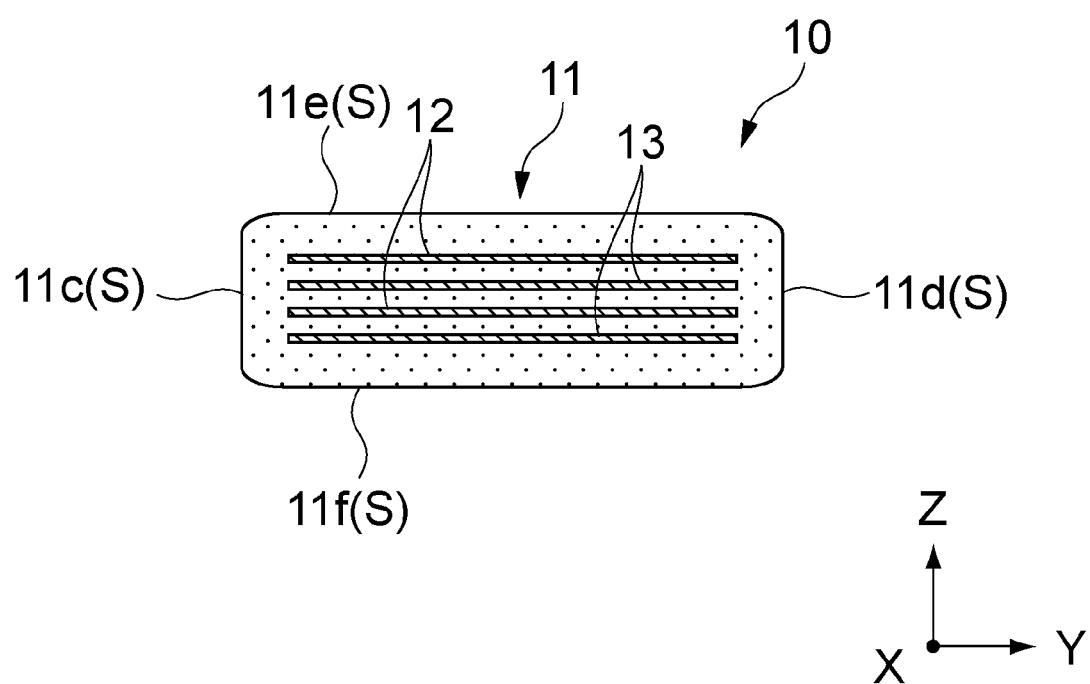
FIG. 3 is a cross-sectional view of the multilayer ceramic capacitor taken along line B-B' in FIG. 1.

FIG. 1 to FIG. 3 illustrate a multilayer ceramic capacitor 10 in accordance with a first embodiment. FIG. 1 is a perspective view of the multilayer ceramic capacitor 10. FIG. 2 is a cross-sectional view of the multilayer ceramic capacitor 10 taken along line A-A' in FIG. 1. FIG. 3 is a cross-sectional view of the multilayer ceramic capacitor 10 taken along line B-B' in FIG. 1.

The multilayer ceramic capacitor 10 includes a ceramic body 11, a first external electrode 14a, and a second external electrode 14b.

The ceramic body 11 is configured as a rectangular parallelepiped having a first end surface 11a and a second end surface 11b extending along the Y-axis direction and the Z-axis direction, a first side surface 11c and a second side surface 11d extending along the X-axis direction and the Z-axis direction, and a first principal surface 11e and a second principal surface 11f extending along the X-axis direction and the Y-axis direction. The "rectangular parallelepiped" may be a substantially rectangular parallelepiped. For example, gentle irregularities may be formed on the surface of the ceramic body 11, or ridges connecting the surfaces of the ceramic body 11 may be rounded.

The first and second end surfaces 11a and 11b are configured as flat surfaces perpendicular to the X-axis. The flat surface in the present embodiment does not have to be strictly a flat surface as long as it is a surface recognized as flat when viewed as a whole, and includes, for example, a surface having a minute uneven shape of the surface, a surface having a gently curved shape within a predetermined range, and the like.

In the present embodiment, each of the first side surface 11c, the second side surface 11d, the first principal surface 11e, and the second principal surface 11f is configured as a connection surface S that connects the first and second end surfaces 11a and 11b and extends along the X-axis direction. As will be described later, at least one of the four connection surfaces S has an uneven region P.

The multilayer ceramic capacitor 10 in accordance with the present embodiment is configured as a low-height type capacitor having a small thickness in the Z-axis direction. Specifically, the dimension of the multilayer ceramic capacitor 10 in the Z-axis direction is, for example, 100 μm or less. The dimension of the multilayer ceramic capacitor 10 in the X-axis direction is, for example, 0.1 mm or greater and 2.0 mm or less. The dimension of the multilayer ceramic capacitor 10 in the Y-axis direction is, for example, 0.1 mm or greater and 2.0 mm or less. The multilayer ceramic capacitor 10 may have a longitudinal direction in any of the X-axis direction and the Y-axis direction, and has a longitudinal direction in the X-axis direction in the examples illustrated in FIG. 1 to FIG. 3. The "dimension" of the multilayer ceramic capacitor 10 in a certain direction is the maximum dimension in the direction.

The first external electrode 14a is disposed on the first end surface 11a. The second external electrode 14b is disposed on the second end surface 11b. The external electrodes 14a and 14b face each other in the X-axis direction. As will be described later, the external electrodes 14a and 14b may extend from the respective end surfaces 11a and 11b to other surfaces.

The ceramic body 11 includes first internal electrodes 12 and second internal electrodes 13 stacked in the Z-axis direction with ceramic layers interposed therebetween. In the example illustrated in FIG. 2 and FIG. 3, the internal electrodes 12 and 13 each have a sheet shape extending along the X-Y plane, and are alternately arranged along the Z-axis direction.

The internal electrodes 12 and 13 contain a conductive component as a main component. A typical example of the conductive component is nickel (Ni), and other examples thereof include copper (Cu), palladium (Pd), platinum (Pt), silver (Ag), gold (Au), and alloys thereof.

For example, the thickness of each of the internal electrodes 12 and 13 in the Z-axis direction may be, for example, 0.2 μm or greater and 1.0 μm or less. Thus, the internal electrodes 12 and 13 can be configured to be thin. The number of the internal electrodes 12 and 13 is not limited to the example illustrated in the drawing.

The first internal electrodes 12 are led out to the first end surface 11a and are spaced apart from the second end surface 11b. Thus, the first internal electrodes 12 are connected to the first external electrode 14a on the first end surface 11a and are insulated from the second external electrode 14b. The second internal electrodes 13 are led out to the second end surface 11b and are spaced apart from the first end surface 11a. Thus, the second internal electrodes 13 are connected to the second external electrode 14b on the second end surface 11b, and are insulated from the first external electrode 14a.

With such a configuration, in the multilayer ceramic capacitor 10, when a voltage is applied between the external electrodes 14a and 14b, the voltage is applied to the plurality of ceramic layers between the internal electrodes 12 and 13.

As a result, an electric charge corresponding to the voltage between the external electrodes 14a and 14b is stored in the multilayer ceramic capacitor 10.

In the ceramic body 11, in addition to the ceramic layers between the internal electrodes 12 and 13, the portion surrounding the internal electrodes 12 and 13 is also made of ceramic. The dielectric ceramic used for the ceramic body 11 has, for example, a perovskite structure represented by the general formula $ABO_3$. Examples of the dielectric ceramic having a perovskite structure include a material containing barium (Ba) and titanium (Ti) typified by barium titanate ($BaTiO_3$).

Specifically, the dielectric ceramic may be barium titanate, strontium titanate ($SrTiO_3$), calcium titanate ($CaTiO_3$), magnesium titanate ($MgTiO_3$), calcium zirconate ($CaZrO_3$), calcium zirconate titanate ($Ca(Ti, Zr, Ti)O_3$), barium calcium zirconate titanate ($(Ba, Ca) (Ti, Zr)O_3$), barium zirconate ($BaZrO_3$), titanium oxide ($TiO_2$), or the like.

The thickness of each ceramic layer in the Z-axis direction may be, for example, 0.2 μm or greater and 1.0 μm or less. Thus, the thickness of the ceramic body 11 can be reduced, and the capacitance of the multilayer ceramic capacitor 10 can be increased.

Structure of the External Electrode

As illustrated in FIG. 1 and FIG. 2, the first external electrode 14a extends from the first end surface 11a to the first principal surface 11e and the side surfaces 11c and 11d. Similarly, the second external electrode 14b extends from the second end surface 11b to the first principal surface 11e and the side surfaces 11c and 11d. The external electrodes 14a and 14b may not be necessarily formed up to the lower end portions of the end surfaces 11a and 11b and the side surfaces 11c and 11d in the Z-axis direction (the ends closer to the second principal surface 11f) as long as they cover all the ends of the internal electrodes 12 and 13 exposed to the end surfaces 11a and 11b.

Each of the external electrodes 14a and 14b has a plurality of layers in the present embodiment. Specifically, each of the external electrodes 14a and 14b includes a conductive thin film 141 and a plating film 142 formed on the conductive thin film 141.

In the present embodiment, the conductive thin film 141 is configured as a sputtered film formed by sputtering. Alternatively, the conductive thin film 141 may be a conductive thin film formed by electroless plating, vapor deposition, printing, dipping, or the like. The conductive thin film 141 contains, for example, Ti, Ni, Ag, Au, Pt, Pd, Cu, tantalum (Ta), tungsten (W), or an alloy thereof. The conductive thin film 141 may be a single layer or may include a plurality of layers.

The thickness of the conductive thin film 141 may be, for example, 1.0 μm or less. This configuration allows the external electrodes 14a and 14b to be formed thin, and the multilayer ceramic capacitor 10 can be configured to be thinner.

The plating film 142 forms an outer layer of each of the external electrodes 14a and 14b and covers the conductive thin film 141. The plating film 142 is a film formed by a wet plating method such as an electrolytic plating method using the conductive thin film 141 as a base, and has one layer or a plurality of layers. Each layer of the plating film 142 contains, for example, at least one of Ni, Cu, tin (Sn), Pd, or Ag as a main component.

These external electrodes 14a and 14b are required to be reliably insulated from each other in order to inhibit short-circuiting caused by electrical connection. On the other hand, in view of miniaturization of the multilayer ceramic capacitor 10 in recent years, the distance between the external electrodes 14a and 14b is also reduced, and the risk of electrical connection between the external electrodes 14a and 14b is increased. In addition, with the diversification of usage modes of the multilayer ceramic capacitor 10, the multilayer ceramic capacitor 10 is often used in a high-humidity environment. This also increases the risk of insulation failure of the multilayer ceramic capacitor 10.

For example, in a high-humidity environment, dew condensation may occur on the surfaces of the ceramic body 11, and the metals in the external electrodes 14a and 14b may be ionized and eluted. This may cause so-called migration in which metal ions move on the surface of the ceramic body 11. As the metal ions eluted from one external electrode approach the other external electrode, the risk of generation of a leakage current on the surface of the ceramic body 11 increases. Therefore, it is considered that the risk of insulation failure of the multilayer ceramic capacitor 10 decreases as the migration distance of the metal ions between the external electrodes 14a and 14b increases.

In addition, for example, when the plating film 142 is formed, so-called plating elongation may occur in which the plating film 142 extends from the conductive thin film 141 to the surface of the ceramic body 11. When plating elongation occurs, the solders formed on the external electrodes 14a and 14b are likely to come into contact with each other at the time of mounting the multilayer ceramic capacitor on a mounting substrate, and the possibility of causing a short circuit increases.

The inventors have conceived of forming unevenness (undulations) on the surface of the ceramic body 11 to increase the distance along the surface of the ceramic body 11 between the external electrodes 14a and 14b in order to inhibit such an insulating failure of the multilayer ceramic capacitor 10. Furthermore, since defects such as cracking of the ceramic body 11 are likely to occur depending on the shape of the unevenness, the inventors have found an optimum shape of the unevenness for improving the reliability of the multilayer ceramic capacitor 10. Hereinafter, the configuration of the uneven region P in the present embodiment will be described.

Configuration of the Uneven Region

Figure 4:
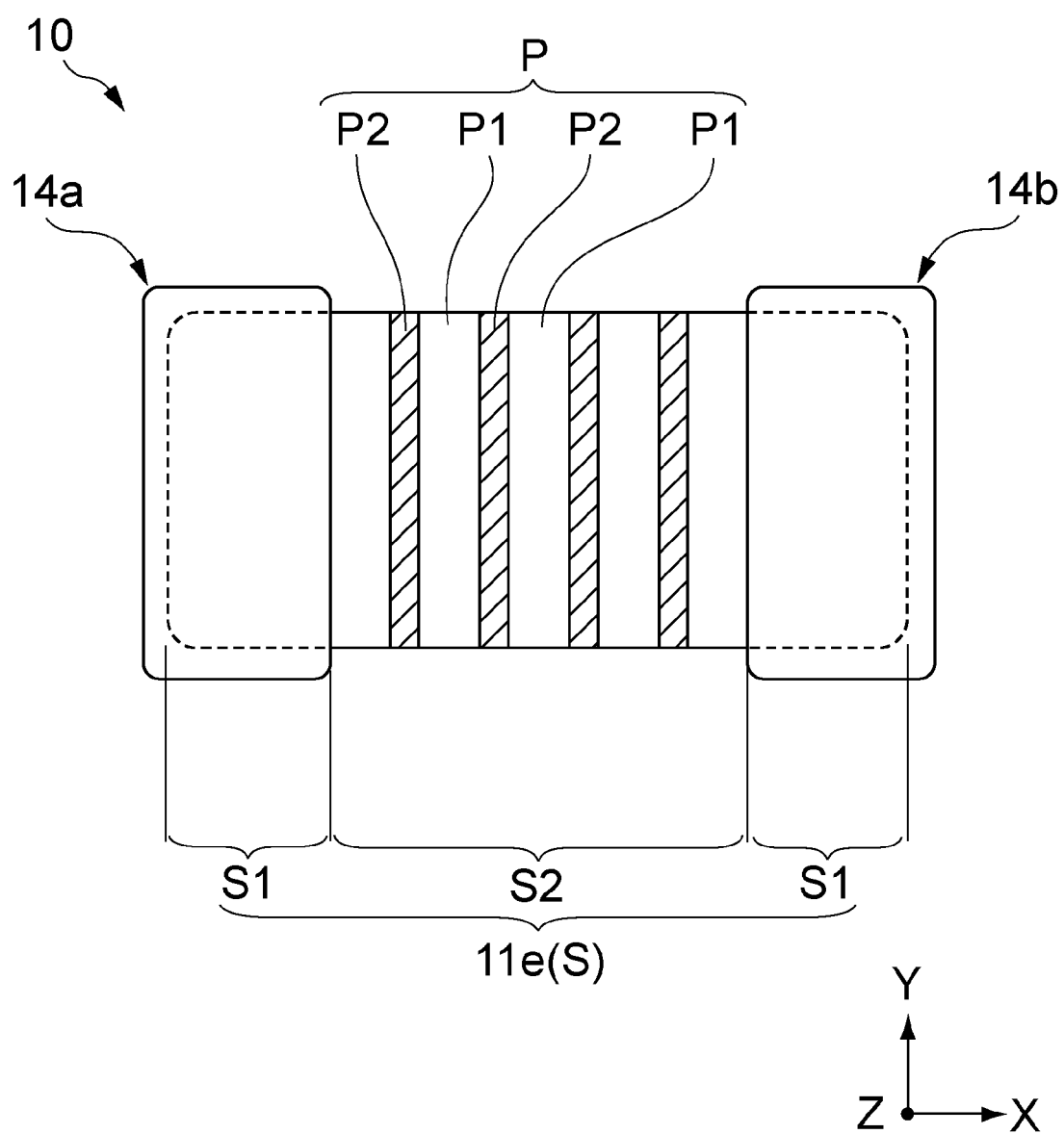
FIG. 4 is a top view (plan view) of the multilayer ceramic capacitor.

FIG. 4 is a plan view of the multilayer ceramic capacitor 10 viewed from above in the Z-axis direction (from the first principal surface 11e side). In the present embodiment, the first principal surface 11e has the uneven region P located between the external electrodes 14a and 14b. In the present embodiment, in addition to the first principal surface 11e, each of the first and second side surfaces 11c and 11d may also have the uneven region P. Hereinafter, the uneven region P on the first principal surface 11e will be described in detail, and the uneven regions P on the first side surface 11c and the second side surface 11d will be described later.

In the present embodiment, the first principal surface 11e configured as the connection surface S has a pair of electrode-forming regions S1 covered with the external electrodes 14a and 14b, respectively, and an intermediate region S2 between the pair of the electrode-forming regions S1, and the uneven region P is formed only in the intermediate region S2. In other words, the uneven region P is not formed in the electrode-forming regions S1. This configuration allows the external electrodes 14a and 14b to be flattened, and the orientation of the multilayer ceramic capacitor 10 during mounting can be stabilized.

The uneven region P includes a plurality of recess portions P1 and a plurality of protrusion portions P2 disposed between the plurality of the recess portions P1. In FIG. 4, the protrusion portions P2 are represented by hatched patterns.

In the present embodiment, each recess position P1 is formed along the Y-axis direction and recessed in the Z-axis direction. The plurality of the recess portions P1 are regularly arranged along the X-axis direction. That is, in the present embodiment, the extension direction of the recess portion P1 is parallel to the Y-axis direction, the depth direction is parallel to the Z-axis direction, and the arrangement direction is parallel to the X-axis direction. The recess portion P1 includes a bottom portion P10 that is the deepest portion in a cross section (for example, the X-Z cross section) parallel to the depth direction and the arrangement direction (see FIG. 5). The extension direction of the recess portion P1 is the extension direction of the bottom portion P10.

The protrusion portion P2 is formed along the Y-axis direction between the recess portions P1. The protrusion portion P2 includes a top portion P20 that protrudes most in a cross section (for example, the X-Z cross section) (see FIG. 5). The extension direction of the protrusion portion P2 is the extension direction of the top portion P20 and is parallel to the Y-axis direction in the present embodiment.

For example, when the dimension of the multilayer ceramic capacitor 10 in the X-axis direction is 1.0 mm, the number of the recess portions P1 included in the uneven region P is preferably 2 or greater and 60 or less. The number of the protrusion portions P2 included in the uneven region P is preferably 1 or greater and 59 or less. The ratio of the dimension of the uneven region P in the X-axis direction to the dimension of the multilayer ceramic capacitor 10 in the X-axis direction is preferably 5% or greater and 60% or less, for example. In addition, the uneven region P is preferably formed across the entirety in the Y-axis direction of the first principal surface 11e. The number of the recess portions P1 and the number of the protrusion portions P2 can be appropriately adjusted according to the distance in the X-axis direction between the external electrodes 14a and 14b.

In the present embodiment, the uneven region P can be formed by laser irradiation. More specifically, the uneven region P is formed as scanning traces when, for example, a conductive thin film formed on the entire first principal surface 11e is irradiated with a short-pulse laser to sublimate and remove the conductive thin film. In this case, the shapes of the recess portions P1 and the protrusion portions P2 can be adjusted by the irradiation condition and the scanning condition of the short-pulse laser. Details of a method of forming the uneven region P will be described later.

In the present embodiment, the uneven region P has a configuration in which the recess portions P1 and the protrusion portions P2 extending in the Y-axis direction are alternately arranged in the X-axis direction and undulate at regular intervals along the X-axis direction. As a result, in order to cross the surface of the uneven region P in the X-axis direction, it is required to pass through undulations formed by the recess portions P1 and the protrusion portions P2. That is, the uneven region P can increase the length of the contour of the first principal surface 11e in the X-Z cross section between the external electrodes 14a and 14b.

Therefore, the uneven region P can reduce the risk of electrical connection between the external electrodes 14a and 14b. For example, when migration occurs, it is possible to reduce the risk that metal ions eluted from one external electrode approach the other external electrode, and it is possible to inhibit generation of a leakage current. In addition, it is possible to inhibit the plating elongation along the X-axis direction by the undulation formed by the recess portions P1 and the protrusion portions P2.

On the other hand, when the recess portion P1 is too deep, the protrusion portion P2 protrudes sharply, and the ceramic body 11 is likely to be cracked or chipped. In addition, when the arrangement pitch of the recess portions P1 is too narrow or too wide, the risk of cracking or chipping is increased, and there is a problem that undulations of the recess portions P1 and the protrusion portions P2 cannot be sufficiently obtained. Therefore, the present embodiment inhibits the electrical connection between the external electrodes 14a and 14b while inhibiting problems associated with the unevenness, by setting the shape of the recess portion P1 as follows.

Figure 5:
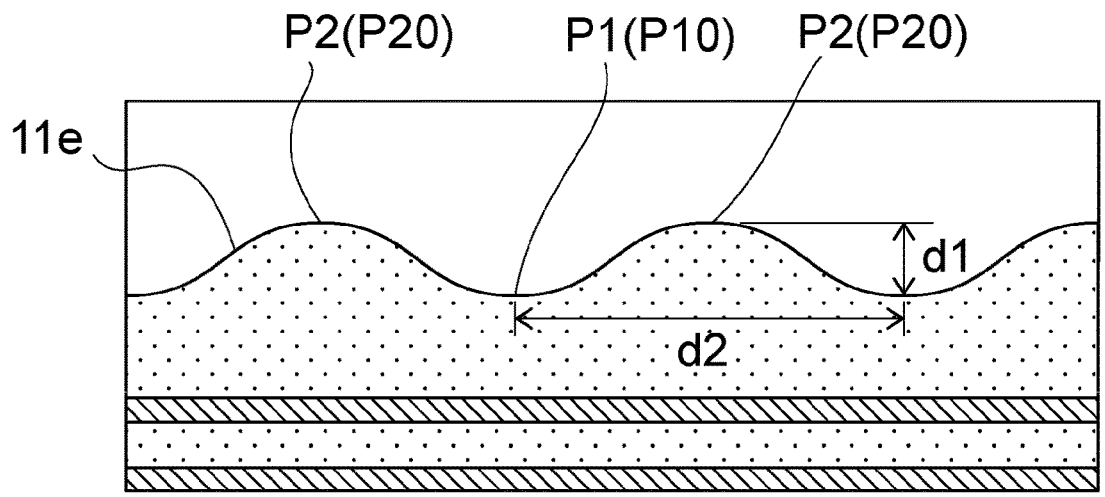
FIG. 5 is an enlarged cross-sectional view of a part of FIG. 2.
Figure 5:
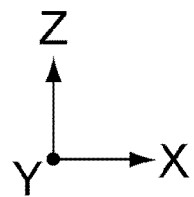

FIG. 5 is an enlarged cross-sectional view of a part of FIG. 2. In the cross-sectional views of FIG. 5, FIG. 2, and the like, the depth of the uneven region P is emphasized more than the actual depth. As illustrated in FIG. 5, the uneven region P is formed of repeated gently curved shapes.

In the present embodiment, the depth $d1$ of the recess portion P1 is 0.1 µm or greater and less than 2.5 µm. This configuration moderates the depth of the recess portion P1, and inhibits cracks in the protrusion portion P2. The depth $d1$ is preferably 0.2 µm or greater and 2.3 µm or less, and more preferably 0.5 µm or greater and 2.0 µm or less. This configuration enables to obtain an effect of increasing the surface area of the first principal surface 11e by the recess portions P1, and can more reliably inhibit cracking or chipping in the protrusion portions P2.

The depth $d1$ of the recess portion P1 in the Z-axis direction (depth direction) is the dimension from the top portion P20 of the protrusion portion P2 to the bottom portion P10 of the recess portion P1 in a cross section (for example, the X-Z cross section) of the uneven region P. When the depths of the recess portions P1 included in the uneven region P are different, the average value of the depths of the plurality of the recess portions P1 is defined as the depth $d1$. When the heights of the top portions P20 on both sides of the recess portion P1 are different, the dimension from the higher top portion P20 to the bottom portion P10 of the recess portion P1 is measured.

A distance along the X-axis direction (the arrangement direction) between the bottom portions P10 of the adjacent recess portions P1 is defined as the arrangement pitch $d2$ of the recess portions P1. For example, the arrangement pitch $d2$ of the recess portions P1 can be the average value of dimensions between the bottom portions P10 at a plurality of locations in a cross section (for example, the X-Z cross section) of the uneven region P. For example, values calculated by measuring ten locations selected at random can be employed as the average value of the depth $d1$ and the average value of the arrangement pitch $d2$.

The arrangement pitch $d2$ of the recess portions P1 is 1 µm or greater and 80 µm or less, preferably 2 µm or greater and 70 µm or less, and more preferably 5 µm or greater and 40 µm or less. When the arrangement pitch $d2$ is within the above range, the undulations along the X-axis direction can be effectively formed, and cracking or chipping of the ceramic body 11 can be inhibited. In addition, when the arrangement pitch $d2$ is adjusted to be 80 µm or less, the conductive thin film can be inhibited from remaining when the conductive thin film is removed by irradiation with a short-pulse laser.

The ratio of the arrangement pitch $d2$ of the recess portions P1 to the depth $d1$ of the recess portion P1 is preferably 0.41 or greater and 700 or less, more preferably 2.5 or greater and 80 or less. This configuration can make the arrangement pitch d2 of the recess portions P1 sufficiently large with respect to the depth d1 of the recess portion P1, and stable undulation can be formed on the first principal surface 11e.

Here, the recess portions P1 and the protrusion portions P2 in the present embodiment are different from surface roughness, and are configured as undulations formed at regular intervals in the connection surface S. Therefore, surface roughness such as face roughness can be measured in each of the recess portion P1 and the protrusion portion P2.

The surface roughness of the recess portion P1 and the surface roughness of the protrusion portion P2 are preferably small. For example, the arithmetic average height Sa of each of the recess portion P1 and the protrusion portion P2 is preferably 1.1 µm or less, and more preferably 0.5 µm or less. The maximum height Sz of each of the recess portion P1 and the protrusion portion P2 is preferably 5.1 µm or less, and more preferably 3.0 µm or less.

This configuration smooths the surfaces of the protrusion portion P2 and the recess portion P1 sufficiently, and inhibits damage such as cracks. In addition, when the multilayer ceramic capacitor 10 is mounted on a mounting substrate and then sealed with a resin, the resin easily enters between the uneven region P and the mounting substrate or other electronic components, and the insulation property by sealing with the resin can be enhanced.

Furthermore, the absolute value of the difference between the arithmetic average height Sa of the protrusion portion P2 and the arithmetic average height Sa of the recess portion P1 is preferably 0.06 µm or less, and more preferably 0.04 µm or less. The absolute value of the difference between the maximum height Sz of the protrusion portion P2 and the maximum height Sz of the recess portion P1 is preferably 4.0 µm or less, and more preferably 2.0 µm or less. This configuration further enhances the smoothness of the surfaces of the protrusion portion P2 and the recess portion P1, and the effect of inhibiting damage such as cracks and the effect of enhancing the sealing performance with resin can be further enhanced.

The surface roughness Sa and Sz of the protrusion portion P2 and the recess portion P1 is surface roughness measured along their extension directions. Specifically, the measurement region for the surface roughness Sa and Sz of each of the protrusion portion P2 and the recess portion P1 is a region including the top portion P20 or the bottom portion P10 and having a length along the extension direction of, for example, 30 to 200 µm and a width along the arrangement direction orthogonal to the extension direction of 0.5 to 10 µm. For a plurality of the recess portions P1 and the protrusion portions P2, the average values of the measured surface roughness Sa and Sz are calculated.

The surface roughness Sa and Sz of the protrusion portion P2 and the recess portion P1 can be controlled by the output of the short-pulse laser, for example, when the uneven region P is formed by irradiation with the short-pulse laser. This will be described later.

The uneven region P on the connection surface S other than the first principal surface 11e may have the same shape as that of the uneven region P on the first principal surface 11e. When two or more of the connection surfaces S have the uneven region P, the reliability of the multilayer ceramic capacitor 10 can be further improved.

Specifically, the recess portions P1 on each connection surface S are formed along the extension direction intersecting the X-axis, recessed in the depth direction orthogonal to the X-axis and the extension direction, and arranged along the arrangement direction orthogonal to the depth direction and the extension direction. The protrusion portions P2 are disposed between the plurality of the recess portions P1. The depth of the recess portion P1 in the depth direction is 0.1 µm or greater and less than 2.5 µm, and the pitch along the arrangement direction of the recess portions P1 is 1 µm or greater and 80 µm or less. For example, in the first side surface 11c and the second side surface 11d, the extension direction of the recess portion P1 is a direction intersecting the X-axis, and may be parallel to the Z-axis direction, for example. The depth direction of the recess portion P1 is parallel to, for example, the Y-axis direction.

Circuit Board

Figure 6:
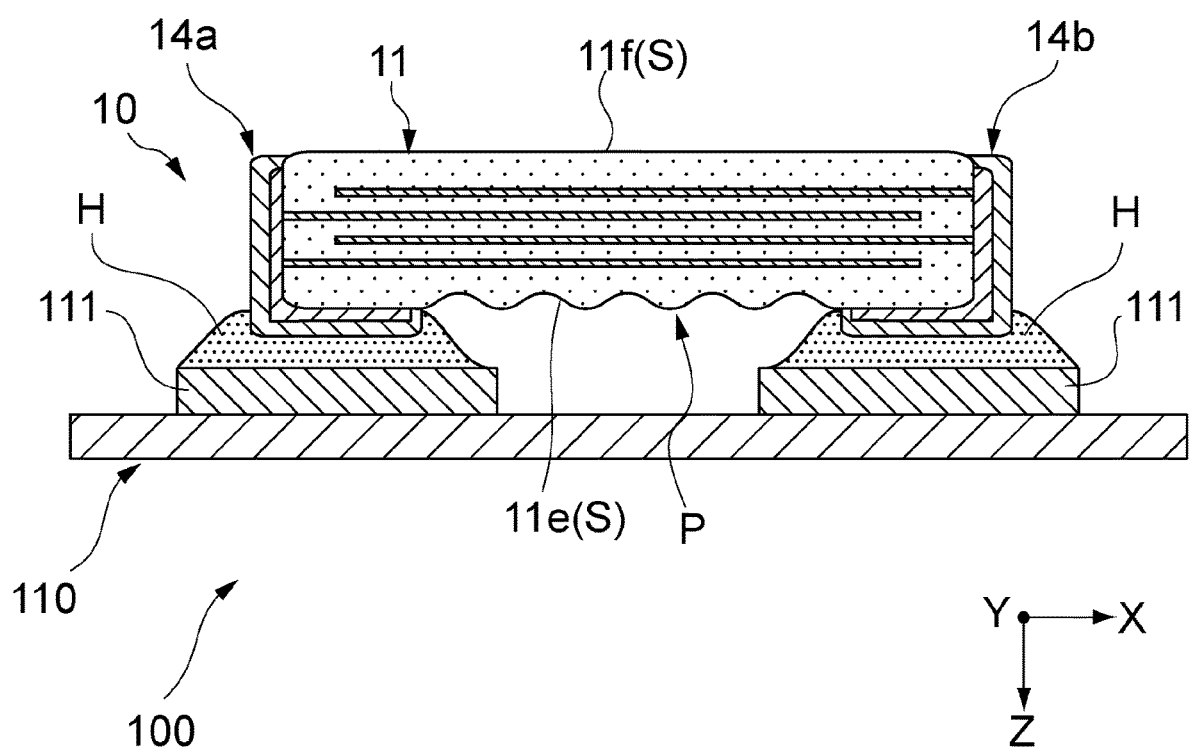
FIG. 6 is a cross-sectional view of a circuit board on which the multilayer ceramic capacitor in accordance with the present embodiment is mounted.

The multilayer ceramic capacitor 10 having the above configuration is to be mounted on, for example, a circuit board 100. FIG. 6 is a cross-sectional view of the circuit board 100 in accordance with the present embodiment.

The circuit board 100 includes the multilayer ceramic capacitor 10 and a mounting substrate 110 on which the multilayer ceramic capacitor 10 is mounted. The mounting substrate 110 includes lands (connection electrodes) 111 connected to the multilayer ceramic capacitor 10. The external electrodes 14a and 14b of the multilayer ceramic capacitor 10 are connected to the lands 111 by, for example, solder H.

In the manufacturing process of the circuit board 100, first, solder H is disposed on each land 111 of the mounting substrate 110. The multilayer ceramic capacitor 10 is disposed on the mounting substrate 110 in a state in which the first principal surface 11e of the ceramic body 11 is opposed to the mounting substrate 110 and the positions of the external electrodes 14a and 14b are aligned with the positions of the respective lands 111.

When the mounting substrate 110 on which the multilayer ceramic capacitor 10 is disposed is heated in a reflow furnace or the like, the solder H on the lands 111 is melted. As a result, the solder H in a molten state wets and spreads along the surfaces of the lands 111 of the mounting substrate 110 and the external electrodes 14a and 14b of the multilayer ceramic capacitor 10. When the solder His cooled and solidified, the multilayer ceramic capacitor 10 is connected to the mounting substrate 110.

The solder H in a molten state basically wets and spreads on the surfaces of the external electrodes 14a and 14b. However, when the external electrodes 14a and 14b are thin, the solder H may also spread on the surfaces of the ceramic body 11 such as the first principal surface 11e. If the solders H of both the external electrodes 14a and 14b come into contact with each other, the external electrodes 14a and 14b are electrically connected to each other, and a short circuit may occur.

On the other hand, in the present embodiment, the first principal surface 11e has the uneven region P, and the recess portions P1 and the protrusion portions P2 are formed along the Y-axis direction intersecting (orthogonal to) the X-axis. Therefore, the solder H is less likely to spread along the X-axis direction, and it is possible to reduce the risk that the solders H of the external electrodes 14a and 14b comes into contact with each other.

In addition, as described above, the plating elongation along the X-axis direction of the external electrodes 14a and 14b is less likely to be formed, and thus it is possible to reduce the risk of electrical connection between the external electrodes 14a and 14b.

Further, the circuit board 100 may be sealed by a resin film applied on the mounting substrate 110. In this case, since the first principal surface 11e has the uneven region P, the recess portions P1 guide the resin in the Y-axis direction, which is the extension direction, and the resin easily enters the space between the first principal surface 11e and the mounting substrate 110. As a result, the insulating effect of the resin film can be enhanced.

Furthermore, since the absolute value of the difference between the surface roughness Sa of the recess portion P1 and the surface roughness Sa of the protrusion portion P2 and the absolute value of the difference between the surface roughness Sz of the recess portion P1 and the surface roughness Sz of the protrusion portion P2 are within the above respective ranges, the smoothness of the surfaces of the recess portion P1 and the protrusion portion P2 is enhanced. This makes it easier for the sealing resin to enter between the uneven region P and the mounting substrate 110.

Manufacturing Method of the Multilayer Ceramic Capacitor

Figure 7:
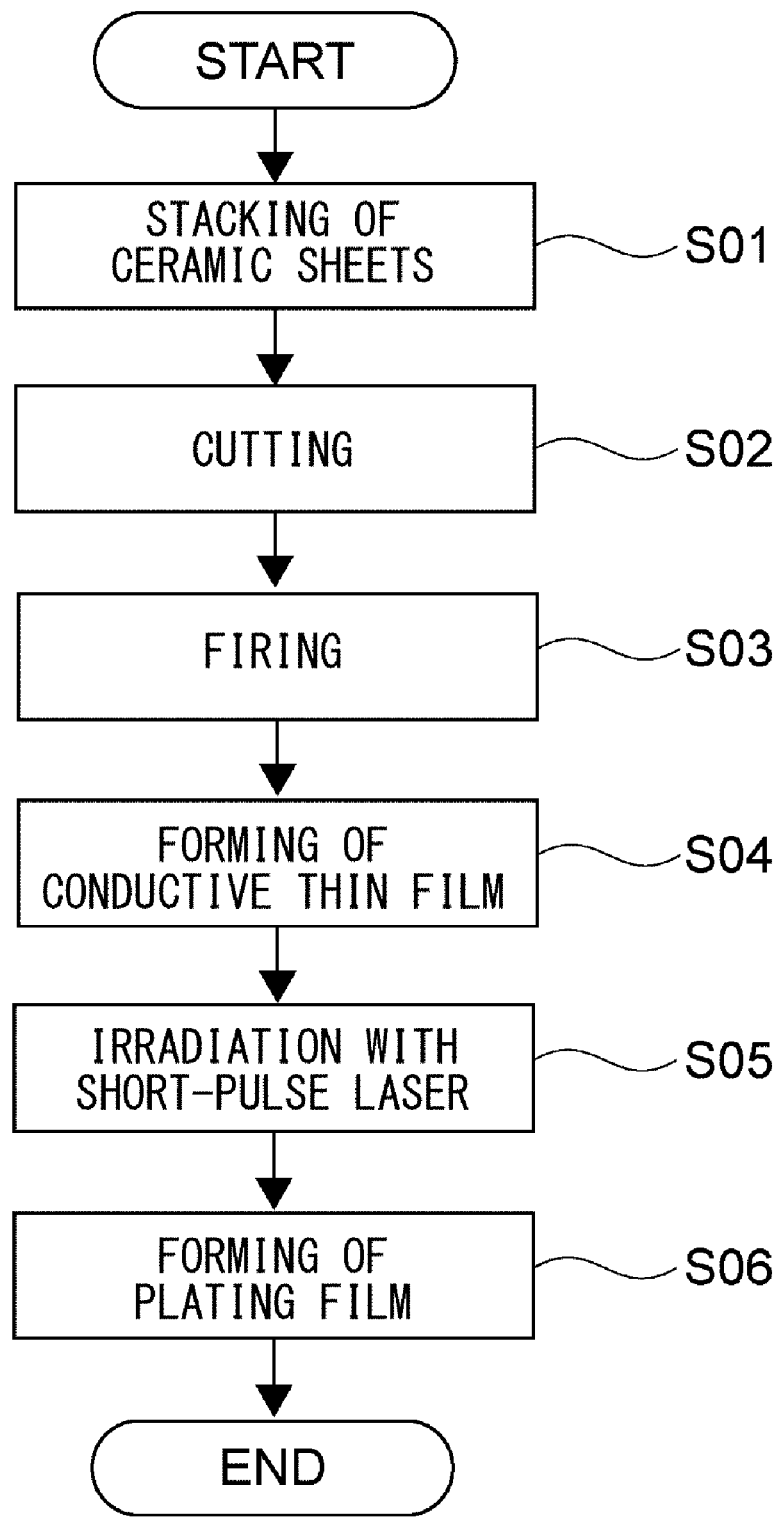
FIG. 7 is a flowchart illustrating a method of manufacturing the multilayer ceramic capacitor.

FIG. 7 is a flowchart illustrating a method of manufacturing the multilayer ceramic capacitor 10. FIG. 8 to FIG. 15 are views for describing a manufacturing process of the multilayer ceramic capacitor 10. Hereinafter, the method of manufacturing the multilayer ceramic capacitor 10 will be described with reference to these drawings.

(Step S01: Stacking of Ceramic Sheets)

Figure 8:
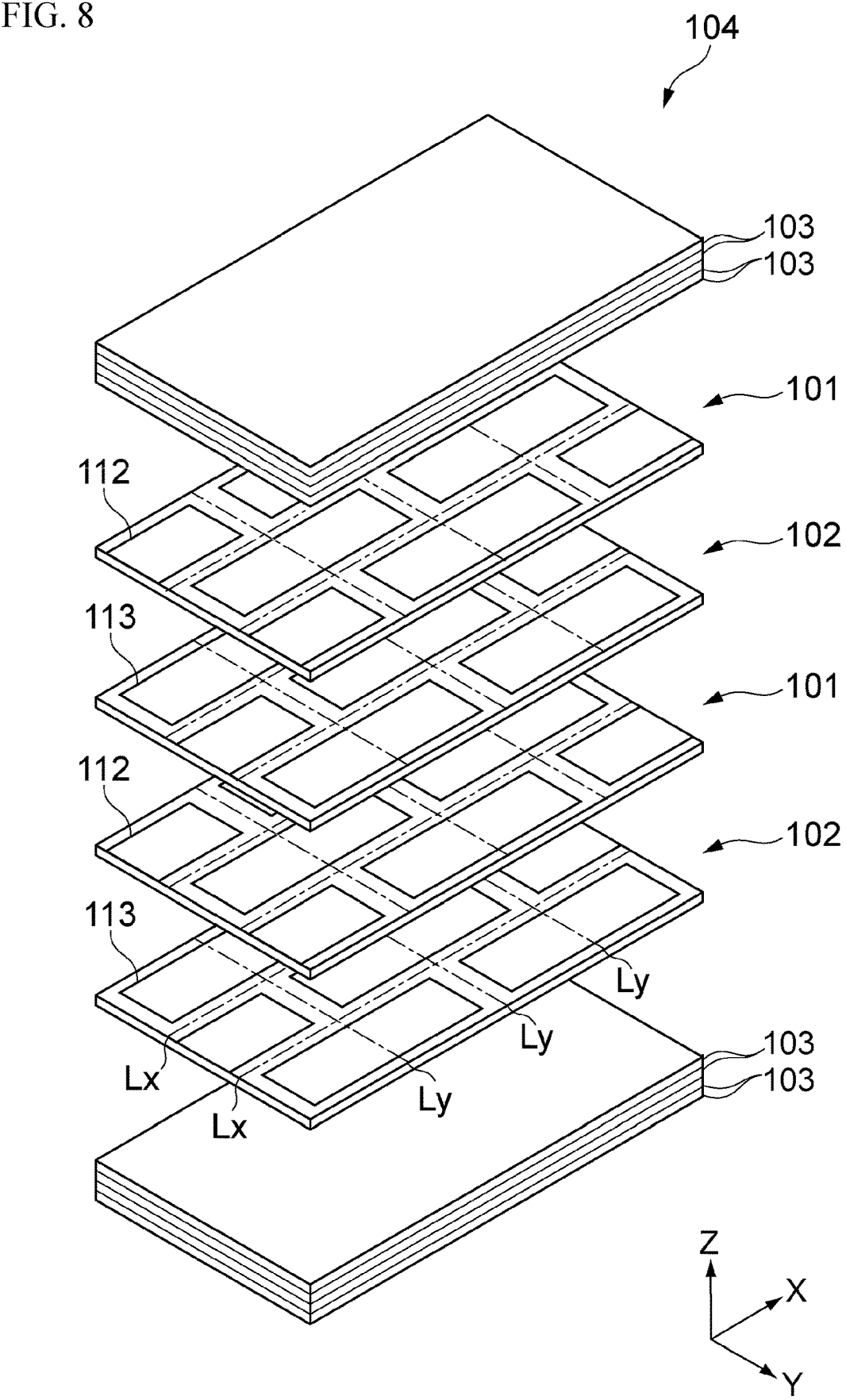
FIG. 8 is a perspective view illustrating a manufacturing process of the multilayer ceramic capacitor and is a view for describing step S01.

In this step, with reference to FIG. 8, ceramic sheets 101, 102, and 103 are stacked to produce a multilayer sheet 104.

The ceramic sheets 101, 102, and 103 are configured as unfired ceramic green sheets containing a dielectric ceramic as a main component. The ceramic sheets 101, 102, and 103 are formed into sheets using a doctor blade method, a die coater method, a gravure coater method, or the like.

As illustrated in FIG. 8, internal electrode patterns 112 and 113 are formed on the ceramic sheets 101 and 102, respectively. The internal electrode patterns 112 and 113 are formed by applying conductive pastes to the ceramic sheets 101 and 102. The first internal electrode pattern 112 corresponds to the first internal electrode 12 and is formed on the first ceramic sheet 101. The second internal electrode pattern 113 corresponds to the second internal electrode 13 and is formed on the second ceramic sheet 102. No internal electrode pattern is formed on the ceramic sheet 103.

Cut lines Lx and Ly for separating the multilayer sheet into individual ceramic bodies 11 are illustrated on each of the ceramic sheets 101, 102, and 103 illustrated in FIG. 8. Each of the internal electrode patterns 112 and 113 is formed in a rectangular shape extending across one cut line Ly, for example. The second internal electrode pattern 113 is formed so as to be shifted from the first internal electrode pattern 112 by one chip in the X-axis direction or the Y-axis direction.

Then, as illustrated in FIG. 8, the ceramic sheets 101 and 102 on which the internal electrode patterns 112 and 113 are formed, respectively, are alternately stacked, and the ceramic sheets 103 including no internal electrode patterns are stacked on and under the stacked ceramic sheets. These ceramic sheets 101, 102, and 103 are integrated by being pressure-bonded. The number of the ceramic sheets 101, 102, and 103 is not limited to the example illustrated in FIG. 8.

(Step S02: Cutting)

In this step, the multilayer sheet 104 is cut along the cut lines Lx and Ly to produce an unfired ceramic body 11. For cutting, a method such as push-cutting or blade dicing can be used.

(Step S03: Firing)

In this step, the unfired ceramic body 11 is fired. Through this step, the ceramic body 11 illustrated in FIG. 1 to FIG. 3 is produced. The firing temperature can be determined based on the firing temperature of the ceramic body 11. For example, when a barium titanate ($BaTiO_3$)-based material is used, the firing temperature can be set to about 1000 to 1350° C. The firing can be performed, for example, in a reducing atmosphere or a low oxygen partial pressure atmosphere.

(Step S04: Forming of Conductive Thin Film)

Figure 9:
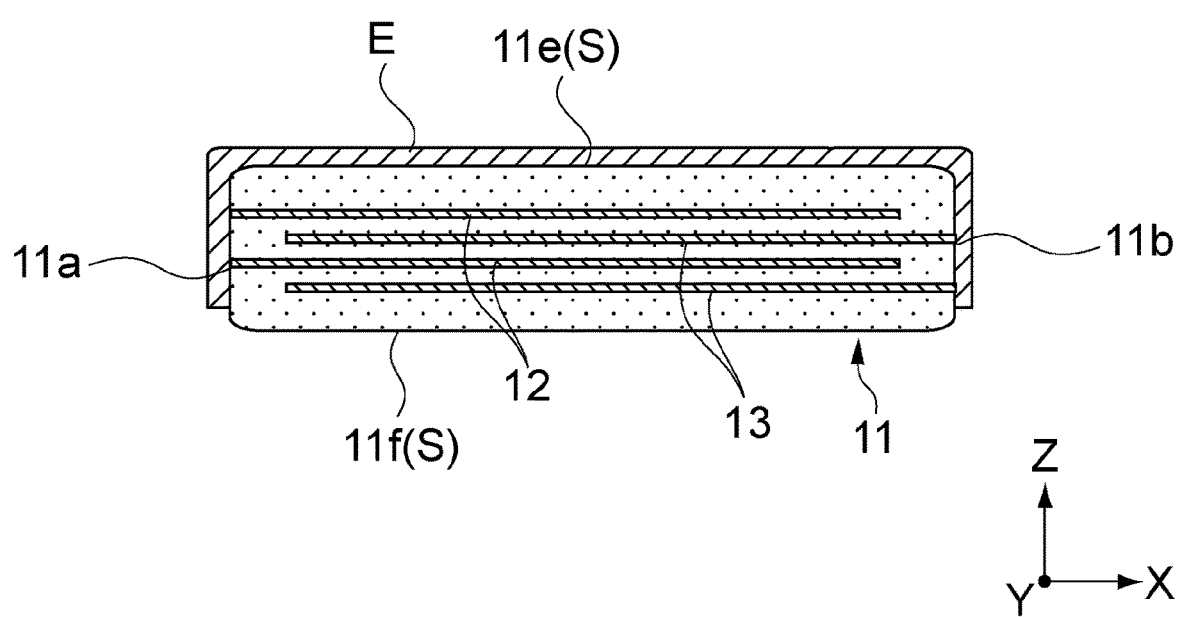
FIG. 9 is a cross-sectional view illustrating the manufacturing process of the multilayer ceramic capacitor and is a view for describing step S04.

In this step, referring to FIG. 9, conductive thin films E are formed on the end surfaces 11a and 11b and at least one surface of the four connection surfaces S. In the present embodiment, the conductive thin film E is formed on each of five surfaces including, for example, the first principal surface 11e, the first and second end surfaces 11a and 11b, and the first and second side surfaces 11c and 11d, and is not formed on the second principal surface 11f. The conductive thin films E are partially removed in the next step to form the conductive thin films 141 of the external electrodes 14a and 14b.

In the present embodiment, the conductive thin film E is formed by sputtering. The sputtering may be performed on the first principal surface 11e as a film formation target, for example. As a result, the film forming material reaches not only the first principal surface 11e but also the end surfaces 11a and 11b and the side surfaces 11c and 11d. As a result, when the ceramic body 11 is thin in the Z-axis direction, the conductive thin film E that sufficiently covers the internal electrodes 12 and 13 exposed to the end surfaces 11a and 11b can be formed by sputtering with the first principal surface 11e as a film formation target.

Alternatively, sputtering may be performed on each surface to be subjected to film formation by changing the orientation of the ceramic body 11.

By forming the conductive thin film E by sputtering, the conductive thin film E can be formed with a thickness of, for example, 1.0 μm or less. As a result, the multilayer ceramic capacitor 10 can be configured to be thin, and the conductive thin film E can be easily removed by irradiation with a short-pulse laser in the next step.

In the present embodiment, the conductive thin film E is formed on the entire first principal surface 11e. Therefore, no mask is required for sputtering. Therefore, the steps of forming and removing the mask can be omitted, and the manufacturing efficiency can be improved. This is also advantageous for the small-sized multilayer ceramic capacitor 10 that requires high accuracy in forming a mask.

(Step S05: Irradiation with Short-Pulse Laser)

In this step, the conductive thin film E on the connection surface S is irradiated with a short-pulse laser having a short pulse width. Through this process, the conductive thin film E in the region irradiated with the short-pulse laser is sublimated and removed, and the conductive thin films 141 of the external electrodes 14a and 14b are formed. Along with this, the uneven region P is formed on the connection surface S.

Specifically, the short-pulse laser used in this step can be selected from pulse lasers having a pulse width in a picosecond range or less. Examples of such a short-pulse laser include a picosecond laser having a pulse width in a picosecond range and a femtosecond laser having a pulse width in a femtosecond range. Specifically, the pulse width of the short-pulse laser is preferably 100 picoseconds or less. By using such a short-pulse laser, the energy intensity at each spot of the laser beam is increased. As a result, the conductive thin film E can be reliably sublimated without melting the conductive thin film E or burning the ceramic body 11.

In the present embodiment, the conductive thin film E formed in the central region of the connection surface S in the X-axis direction is removed. The ratio of the length of the region from which the conductive thin film E is removed in the X-axis direction to the length of the conductive thin film E on the connection surface S in the X-axis direction is preferably, for example, 5% or greater and 60% or less. In addition, the conductive thin film E is preferably removed across the entirety in the direction orthogonal to the X-axis of the connection surface S.

The short-pulse laser irradiation in this step is preferably performed on each of the connection surfaces S on which the conductive thin film E is formed. As a result, the conductive thin film E is reliably separated by the central region of the ceramic body 11 in the X-axis direction, and the conductive thin films 141 of the respective external electrodes 14a and 14b are formed.

Figure 10:
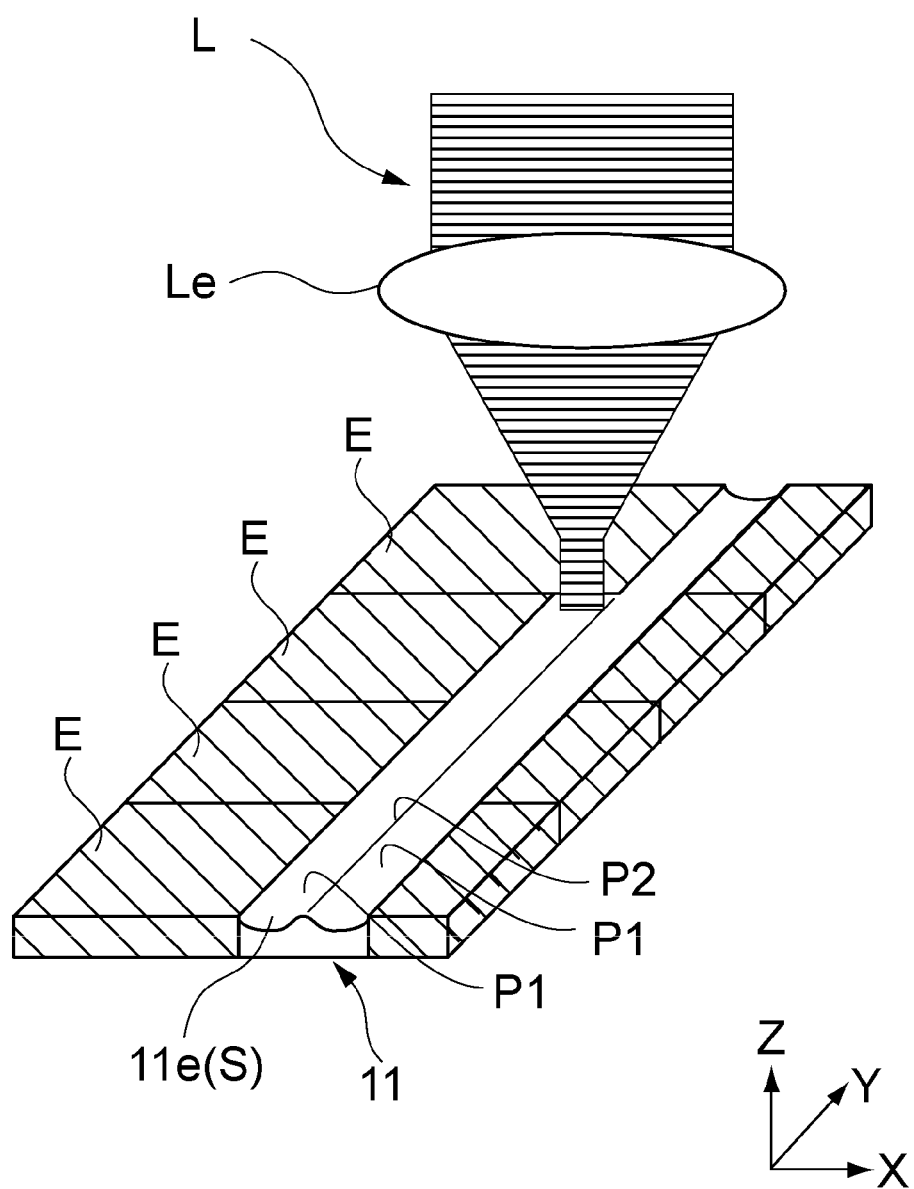
FIG. 10 is a perspective view illustrating the manufacturing process of the multilayer ceramic capacitor and is a view for describing step S05.

FIG. 10 illustrates a state in which the conductive thin film E on the first principal surface 11e of the ceramic body 11 is irradiated with a short-pulse laser (laser) L. An example in which the first principal surface 11e is irradiated with the laser L will be described with reference to FIG. 10.

In the example illustrated in FIG. 10, a plurality of the ceramic bodies 11 are arranged in the Y-axis direction and irradiated with the laser L. As a result, the conductive thin films E of the plurality of ceramic bodies 11 can be continuously irradiated with the laser L, and manufacturing efficiency can be improved. However, this does not intend to suggest any limitation, and a single ceramic body 11 may be irradiated with the laser L.

The laser L is emitted by a laser oscillator and scanned by a scanning mechanism. The reference character Le in FIG. 10 denotes a lens for condensing the laser beam to adjust the spot diameter.

The laser L is scanned on the conductive thin film E with the Y-axis direction, which is the extension direction of the recess portion P1, as the scanning direction, for example. After the laser L is scanned along one scanning line, the laser L is shifted in the X-axis direction and scanned along the next scanning line. By repeatedly scanning the laser L along a plurality of scanning lines in this manner, the conductive thin film E is removed by predetermined widths, and a plurality of scanning marks are formed on the first principal surface 11e.

In the present embodiment, the recess portions P1 are formed on the first principal surface 11e by the scanning traces of the laser L. Therefore, on the first principal surface 11e after the laser irradiation, the plurality of the recess portions P1 formed along the Y-axis direction, which is the scanning direction, are arranged along the X-axis direction. In addition, the protrusion portion P2 is formed between the adjacent recess portions P1. As a result, the uneven region P is formed on the first principal surface 11e.

The number of the recess portions P1 is adjusted by the number of scanning lines. As will be described below, the shape of the recess portion P1 can be adjusted by the spot size and output, and the like of the laser L. Specific conditions such as the output and scanning speed of the laser L, the wavelength of the laser beam, and the frequency of the pulse can be appropriately determined in accordance with the materials of the conductive thin film E and the ceramic body 11, the thickness of the conductive thin film E, and the like. For example, the wavelength of the laser beam can be selected from wavelengths in the ultraviolet region (200 nm or greater) to the visible light region (1000 nm or less), and for example, a green laser can be used as the laser L.

Figure 11A:
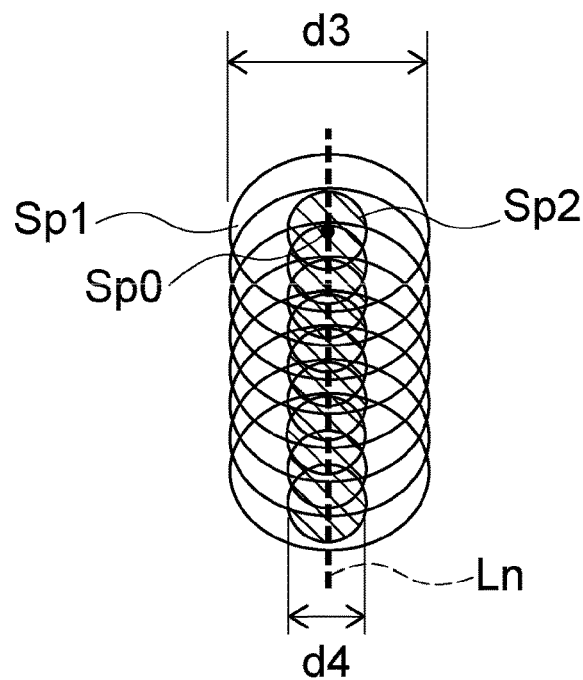
FIG. 11A is a schematic plan view for describing step S05 in the manufacturing process of the multilayer ceramic capacitor, and is a view schematically illustrating a spot on a scanning line of a short-pulse laser.
Figure 11B:
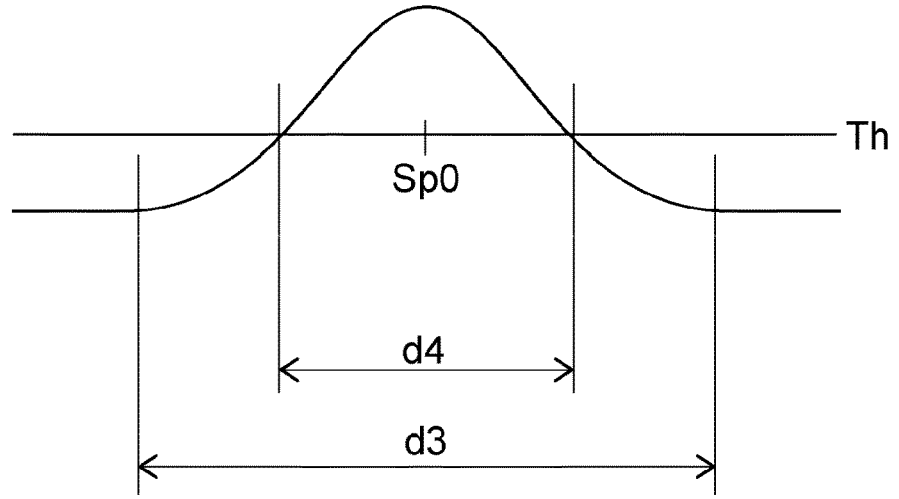
FIG. 11B is a graph illustrating an energy distribution, a spot diameter, and a processing diameter of the laser beam with which each spot of the short-pulse laser beam is irradiated.

FIG. 11A is a plan view schematically illustrating a spot Sp1 on the scanning line Ln of the laser L. FIG. 11B is a graph for describing the energy distribution, the spot diameter, and the processing diameter of the laser beam applied to each spot Sp1, in which the vertical axis represents the energy intensity and the horizontal axis represents the position with the spot center Sp0 as the center. In the following description, an example in which the spot Sp1 of the laser L has a substantially circular shape will be described, but this does not intend to suggest any limitation.

As illustrated in FIG. 11A, the short-pulse laser L is applied so that a plurality of the spots Sp1 overlap in the scanning direction along the scanning line Ln. As illustrated in FIG. 11B, the energy distribution of the laser beam applied to each spot Sp1 has, for example, a Gaussian distribution, and the energy intensity increases at closer distances to the spot center Sp0.

In order to sublimate the conductive thin film E, energy equal to or greater than a predetermined threshold value Th illustrated in FIG. 11B is required. Therefore, the processing diameter d4 of the processing region Sp2 where the conductive thin film E is removed is smaller than the spot diameter d3. That is, as illustrated in FIG. 11A, the size of the processing region Sp2 where the conductive thin film E is actually removed is smaller than the size of the spot Sp1.

In the processing region Sp2, a part of the ceramic body 11 is removed together with the conductive thin film E. As illustrated in FIG. 11B, since the energy of the laser beam applied to the processing region Sp2 becomes stronger at closer distances to the spot center Sp0, the processing region Sp2 has a shape in which the depth increases toward the spot center Sp0. That is, the recess portion P1 is formed by the processing region Sp2, and the bottom portion P10 is formed by the spot center Sp0.

As illustrated in FIG. 11A, the recess portion P1 is formed along the scanning direction by forming the processing regions Sp2 continuously in the scanning direction. Therefore, the groove width of the recess portion P1 depends on the size of the processing region Sp2, that is, the processing diameter d4. The processing diameter d4 is preferably 10 μm or greater and 100 μm or less in consideration of a balance between processing accuracy and processing efficiency.

Figure 12A:
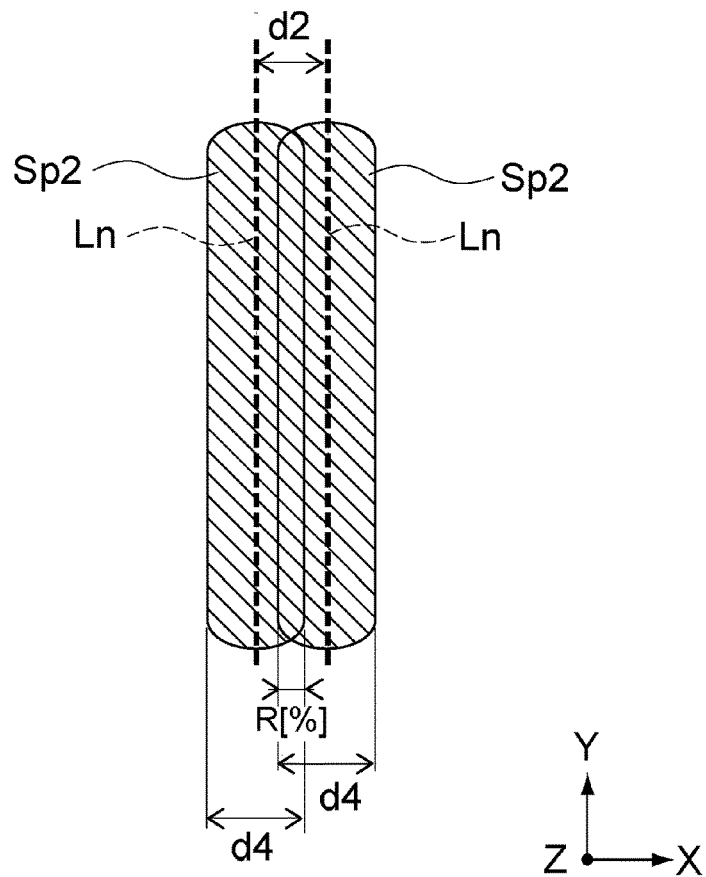
FIG. 12A is a schematic plan view for describing step S05 in the manufacturing process of the multilayer ceramic capacitor, illustrating a processing region formed by spots adjacent to each other in a direction (X-axis direction) orthogonal to the scanning direction.

On the other hand, in the peripheral portion of the processing region Sp2, the depth of the recess portion P1 gradually decreases, and the conductive thin film E is likely to remain. Therefore, as illustrated in FIG. 12A, the processing regions Sp2 on the adjacent scanning lines Ln are overlapped at a predetermined ratio (an overlap ratio R) with respect to the processing diameter d4. The overlap ratio R (%) is a ratio of an overlapping length of the two processing regions Sp2 in the X-axis direction when the processing diameter d4 is 100%. In the present embodiment, in order to prevent the conductive thin film E from remaining, the overlap ratio R is preferably 10% or greater and 95% or less, and more preferably 30% or greater and 90% or less. In FIG. 12A, the plurality of the processing regions Sp2 on the scanning lines Ln are illustrated as continuous strip-shaped regions for the sake of simplicity.

Figure 12B:
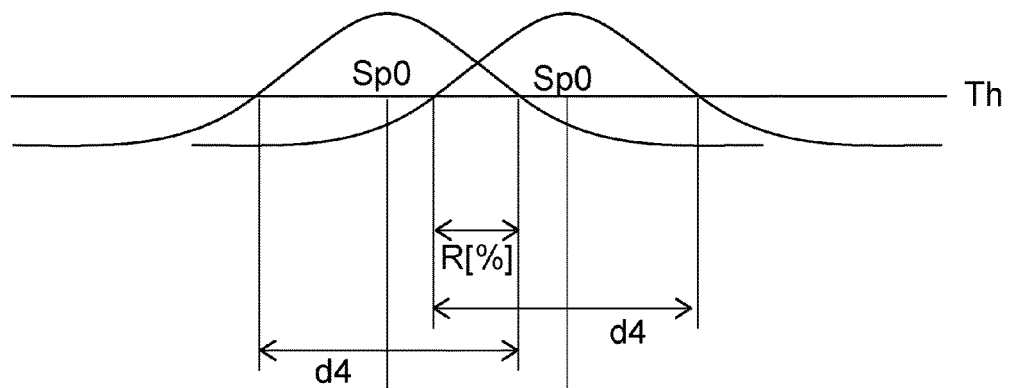
FIG. 12B is a graph illustrating an example of an energy distribution of the laser beam in two spots adjacent to each other in the direction (X-axis direction) orthogonal to the scanning direction, and FIG. 12C schematically illustrates a cross section of recess portions and a protrusion portion formed by a spot having the energy distribution illustrated in FIG. 12B.
Figure 12C:
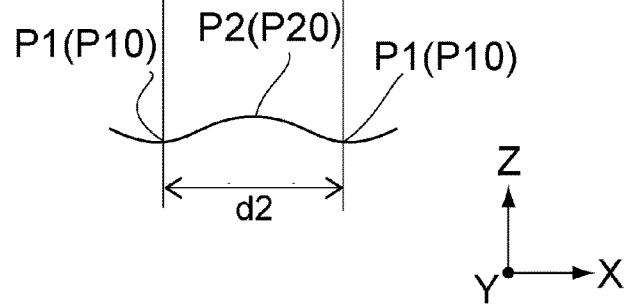

FIG. 12B is a graph presenting an example of the energy distribution of the laser beam in two spots Sp1 adjacent to each other in a direction (the X-axis direction) orthogonal to the scanning direction, in which the vertical axis represents the energy intensity and the horizontal axis represents the position in the X-axis direction. FIG. 12C illustrates an example of cross-sectional shapes of the recess portion P1 and the protrusion portion P2 formed corresponding to the spot Sp1 having the energy distribution illustrated in FIG. 12B.

As illustrated in FIG. 12B and FIG. 12C, the bottom portion P10 of the recess portion P1 is formed at the spot center Sp0 on each scanning line Ln, and the top portion P20 of the protrusion portion P2 is formed at a portion where the sum of the applied energy intensity is the lowest between the two spot centers Sp0. The distance (the scanning pitch) between the adjacent scanning lines Ln is equal to the arrangement pitch d2, which is the distance between the bottom portions P10 of the adjacent recess portions P1.

Therefore, the arrangement pitch d2 is expressed by the following expression using the overlap ratio R (%) and the processing diameter d4.

$$d2=(100-R)\times d4$$

As described above, the arrangement pitch d2 of the recess portions P1 in the present embodiment can be controlled by the overlap ratio R (%) and the processing diameter d4.

Figure 13A:
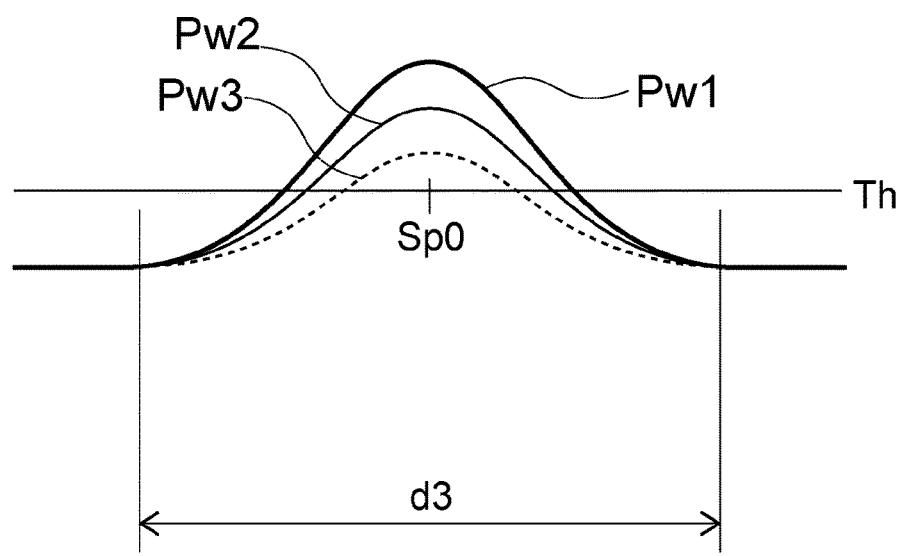
FIG. 13A and FIG. 13B are graphs for describing energy distributions of the laser beams having the same spot diameter and different outputs.
Figure 13B:
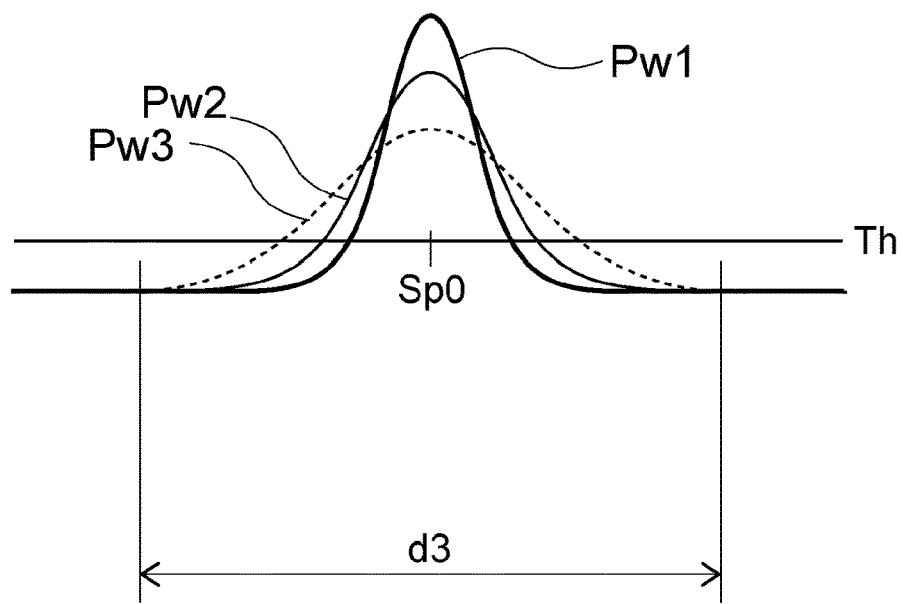

Next, a method of controlling the depth of the recess portion P1 will be described. FIG. 13A and FIG. 13B are graphs for describing the energy distributions of laser beams having the same spot diameter d3 and different outputs, in which the vertical axis represents the energy intensity and the horizontal axis represents the position centered on the spot center Sp0.

In the examples illustrated in FIG. 13A and FIG. 13B, the thick line represents the energy distribution of the spot in the laser having the largest power Pw1, the solid line represents the energy distribution of the spot in the laser having the second largest power Pw2, and the broken line represents the energy distribution of the spot in the laser having the smallest power Pw3. As described above, the bottom portion P10 of the recess portion P1 is formed at the spot center Sp0 where the energy intensity of each spot Sp1 is the largest, and the depth of the recess portion P1 has a positive correlation with the maximum value of the energy intensity of each spot Sp1. Therefore, the depth of the recess portion P1 can be increased by increasing the output of the laser L. In the example illustrated in FIG. 13A and FIG. 13B, the recess portion P1 can be formed deeper in the order of lasers having an output of Pw3, Pw2, and Pw1.

Although the magnitude of the laser output and the processing diameter d4 have a positive correlation in the example illustrated in FIG. 13A, the magnitude of the laser output and the processing diameter d4 may have a negative correlation as illustrated in FIG. 13B.

Furthermore, the output of the laser L can also control the surface roughness of the protrusion portion P2 and the recess portion P1. This will be described with test examples.

Figure 14A:
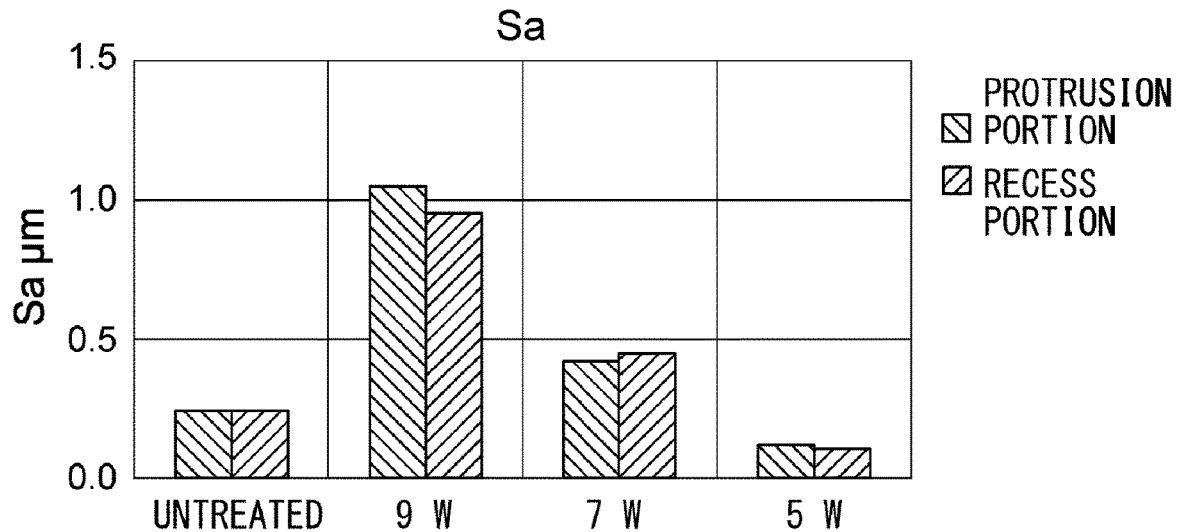
FIG. 14A and FIG. 14B are graphs presenting the values of surface roughness of the protrusion portion and the recess portion when the output of the short-pulse laser is set to 9 W, 7 W, and 5 W, where
Figure 14B:
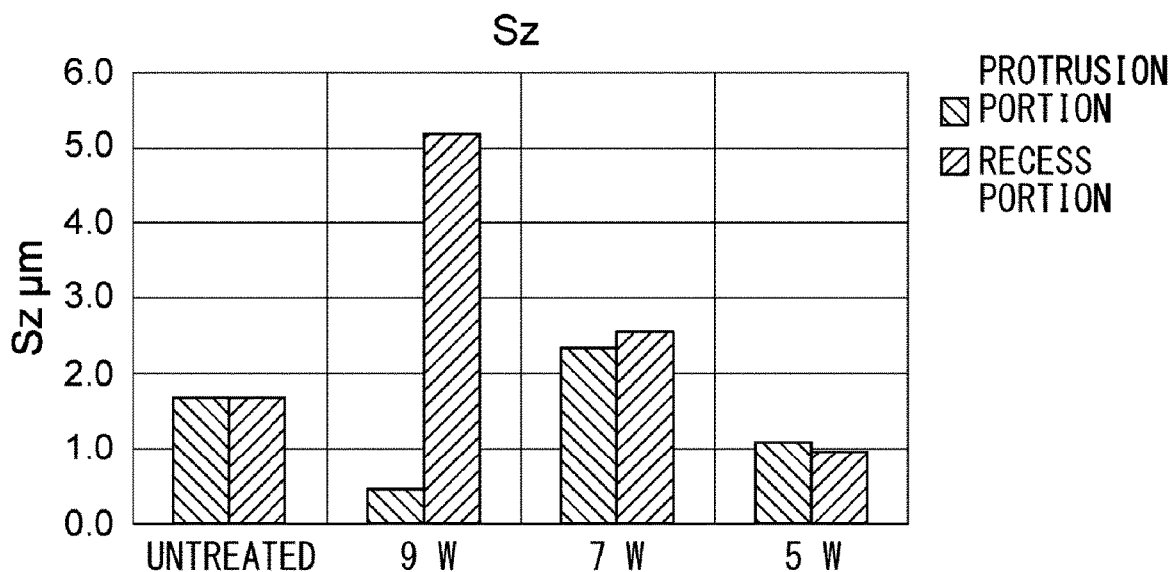
Figure 15A:
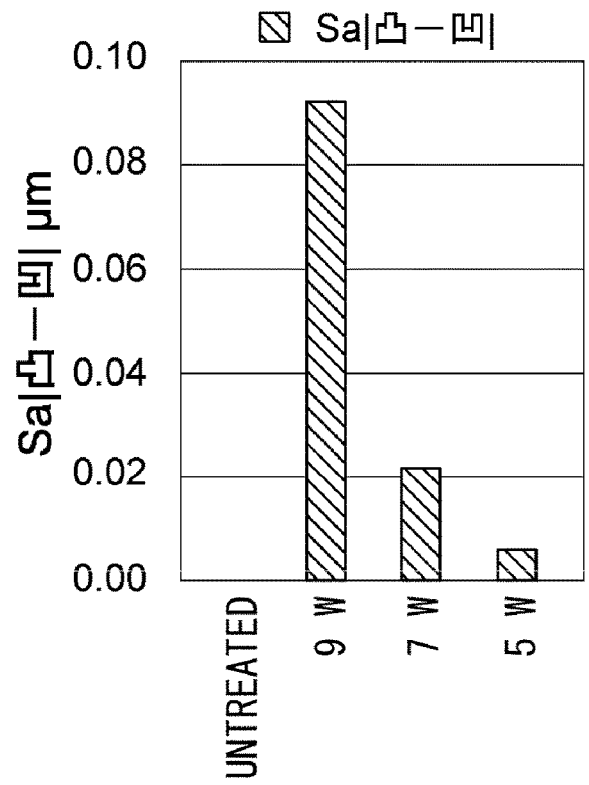
FIG. 15A is a graph presenting the absolute value of the difference between the arithmetic average heights Sa of the protrusion portion P2 and the recess portion P1 calculated from the result of FIG. 14A.
Figure 15B:
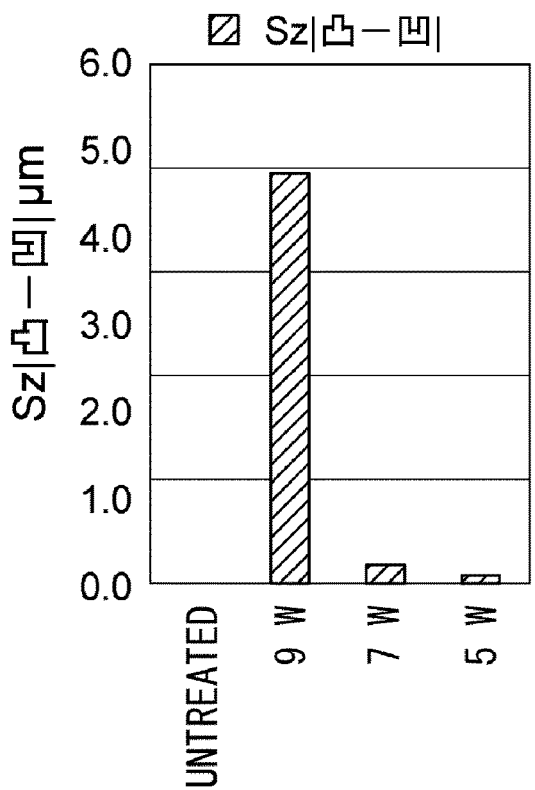
FIG. 15B is a graph presenting the absolute value of the difference between the maximum heights Sz of the protrusion portion P2 and the recess portion P1 calculated from the result of FIG. 14B.

FIG. 14A and FIG. 14B are graphs presenting surface roughness values of the protrusion portion P2 and the recess portion P1 when the output of the short-pulse laser is set to 9 W, 7 W, and 5 W, in which FIG. 14A presents the value of the arithmetic average height Sa and FIG. 14B presents the value of the maximum height Sz. In these graphs, the horizontal axis represents the output of the short-pulse laser. FIG. 15A is a graph presenting the absolute value of the difference between the arithmetic average height Sa of the protrusion portion P2 and the arithmetic average height Sa of the recess portion P1 calculated from the results of FIG. 14A. FIG. 15B is a graph presenting the absolute value of the difference between the maximum height Sz of the protrusion portion P2 and the maximum height Sz of the recess portion P1 calculated from the results of FIG. 14B. In these graphs, the horizontal axis represents the output of the short-pulse laser, and the vertical axis represents the absolute value (μm) of the difference between the arithmetic average heights Sa and the absolute values (μm) of the difference between the maximum heights Sz. "Untreated" in FIG. 14A to FIG. 15B indicates a measured value on the first principal surface 11e before formation of the conductive thin film E.

In these tests, seven recess portions P1 were formed. In addition, a YAG laser having a wave length of 532 nm was used as the short-pulse laser, the scanning direction of the laser was the Y-axis direction, the pulse of the laser was 10 to 20 picoseconds, the scanning speed of the laser was 1000 m/sec, and the pulse frequency of the laser was 400 kHz. In these tests, conditions other than the output of the laser were substantially the same.

The surface roughness of the protrusion portion P2 and the surface roughness of the recess portion P1 were calculated as the average value of the surface roughness of the five measurement regions. The measurement region had a length of 200 μm along the extension direction and a width of 10 μm along the arrangement direction orthogonal to the extension direction. In addition, the arithmetic average height Sa and the maximum height Sz were measured using a laser microscope (VK-X3000 manufactured by KEYENCE CORPORATION).

As illustrated in FIG. 14A, FIG. 14B, FIG. 15A, and FIG. 15B, it was found that the difference between the surface roughness of the recess portion P1 and the surface roughness of the protrusion portion P2 increases as the output of the laser L increases. From this result, in order to adjust the absolute value of the difference between the arithmetic average height Sa of the protrusion portion P2 and the arithmetic average height Sa of the recess portion P1 to be 0.05 μm or less and the absolute value of the difference between the maximum height Sz of the protrusion portion P2 and the maximum height Sz of the recess portion P1 to be 2.0 μm or less, it is preferable to set the output of the short-pulse laser to, for example, 7 W or less.

(Step S06: Forming of Plating Layer)

Finally, a single-layer or multi-layer plating film 142 is formed on the processed conductive thin film 141 to produce the multilayer ceramic capacitor 10 illustrated in FIG. 1 to FIG. 3. The plating film 142 can be formed using, for example, an electrolytic plating method.

Examples and Comparative Examples

Examples and comparative examples of the above embodiment will be described. Samples of the multilayer ceramic capacitors of examples 1 to 6 and comparative examples 1 and 2 were fabricated by varying the output (the power) of the short-pulse laser, the spot diameter d3, and the overlap ratio R. In the examples 1 to 6, the samples were fabricated so that the depth of the recess portion on the first principal surface was 0.1 μm or greater and less than 2.5 μm and the arrangement pitch of the recess portions was 1 μm or greater and 80 μm or less. In the comparative example 1, the samples were fabricated so that the depth of the recess portion was 2.5 μm. In the comparative example 2, samples were fabricated so that the arrangement pitch of the recess portions was 90 μm. Table 1 presents the conditions of the short-pulse laser and the shape of the recess portion after fabrication in each of the examples 1 to 6 and the comparative examples 1 and 2.

In each of the above-described examples and comparative examples, the dimensions along the X-axis, the Y-axis, and the Z-axis of the sample of the multilayer ceramic capacitor were set to 1.0 mm×0.5 mm×0.11 mm. In each of the above examples and comparative examples, a YAG laser having a wavelength of 532 nm was used as the short-pulse laser, the laser scanning direction was the Y-axis direction, the laser pulse was 10 to 20 picoseconds, the laser scanning speed was 1000 m/sec, and the pulse frequency was 400 kHz. A Galvano scanner and an f-theta (θ) lens were used for scanning with the short-pulse laser. In the above-described examples and comparative examples, the samples of the multilayer ceramic capacitor had substantially the same configuration except for the shape of the uneven region.

TABLE 1

| Sample | Laser conditions | | | Shape of recess portion | | Evaluation |
| --- | --- | --- | --- | --- | --- | --- |
| | Power | Spot diameter d3 [µm] | Scanning pitch [µm] | Overlap ratio R [%] | Depth d1 [µm] | Arrangement pitch d2 [µm] | Exterior appearance |
| Example 1 | 0.5 W | 10 | 1 | 90 | 0.1 | 1 | Acceptable |
| Example 2 | 1 W | 10 | 7 | 30 | 0.1 | 7 | Acceptable |
| Example 3 | 3 W | 10 | 7 | 30 | 0.5 | 7 | Acceptable |
| Example 4 | 7 W | 30 | 21 | 30 | 1.5 | 21 | Acceptable |
| Example 5 | 8 W | 60 | 42 | 30 | 2.0 | 42 | Acceptable |
| Comparative example 1 | 9 W | 70 | 49 | 30 | 2.5 | 49 | Rejectable (occurrence of cracks) |
| Example 6 | 9 W | 100 | 70 | 30 | 2.0 | 70 | Acceptable |
| Comparative example 2 | 9 W | 100 | 90 | 10 | 1.0 | 90 | Rejectable (remaining of film) |

The uneven regions of the samples of the examples 1 to 6 and the comparative examples 1 and 2 were visually inspected, and samples having no structural defects such as cracks and remaining of the conductive thin film were evaluated as acceptable, and samples having structural defects were evaluated as rejectable. The results are presented in Table 1.

As presented in Table 1, in the samples of the examples 1 to 6, no structural defect was observed in the uneven region, and the samples were evaluated as acceptable. On the other hand, in the comparative example 1 in which the depth of the recess portion was 2.5 µm, cracks occurred in the uneven region, and the sample was evaluated as rejectable. In addition, in the comparative example 2 in which the arrangement pitch of the recess portions was 90 µm, the conductive thin film remained in the uneven region and the sample was evaluated as rejectable.

These results revealed that the samples of the comparative examples 1 and 2 were in a state in which leakage current was likely to be generated on the surface or inside because of the influence of cracks or remaining conductive thin films. On the other hand, it was found that in the examples 1 to 6, in addition to the formation of unevenness, there was no structural defect on the surface, and the reliability could be improved.

Variation

Figure 16:
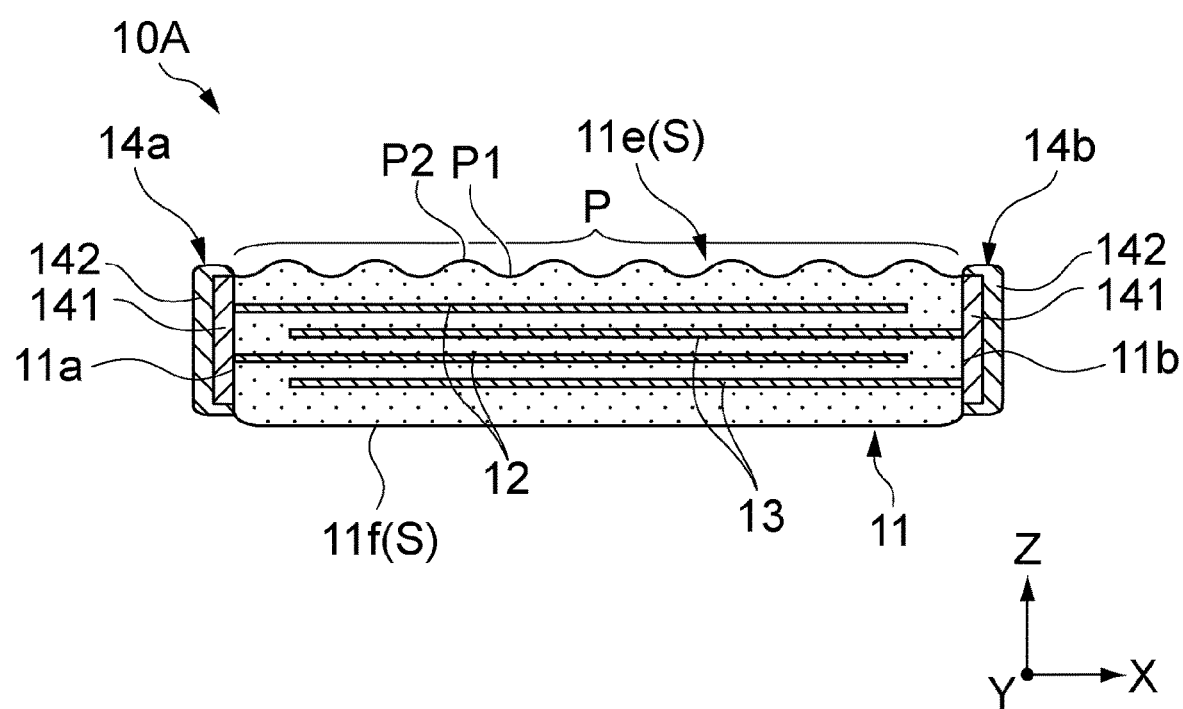
FIG. 16 illustrates a multilayer ceramic capacitor in accordance with a variation of the first embodiment, and is a cross-sectional view at a position corresponding to FIG. 2.

FIG. 16 illustrates a multilayer ceramic capacitor 10A in accordance with a variation of the present embodiment, and is a cross-sectional view at a position corresponding to FIG. 2.

As illustrated in FIG. 16, the uneven region P may be formed across the entire first principal surface 11e (the entire connection surface S). In this case, for example, as illustrated in FIG. 9, after the conductive thin films E are formed on the first and second end surfaces 11a and 11b and the first principal surface 11e, the entire first principal surface 11e is irradiated with the short-pulse laser L, and the uneven region P can be formed on the entire first principal surface 11e.

The external electrodes 14a and 14b may be formed only on the end surfaces 11a and 11b without extending from the end surfaces 11a and 11b to the first principal surface 11e.

Second Embodiment

Figure 17:
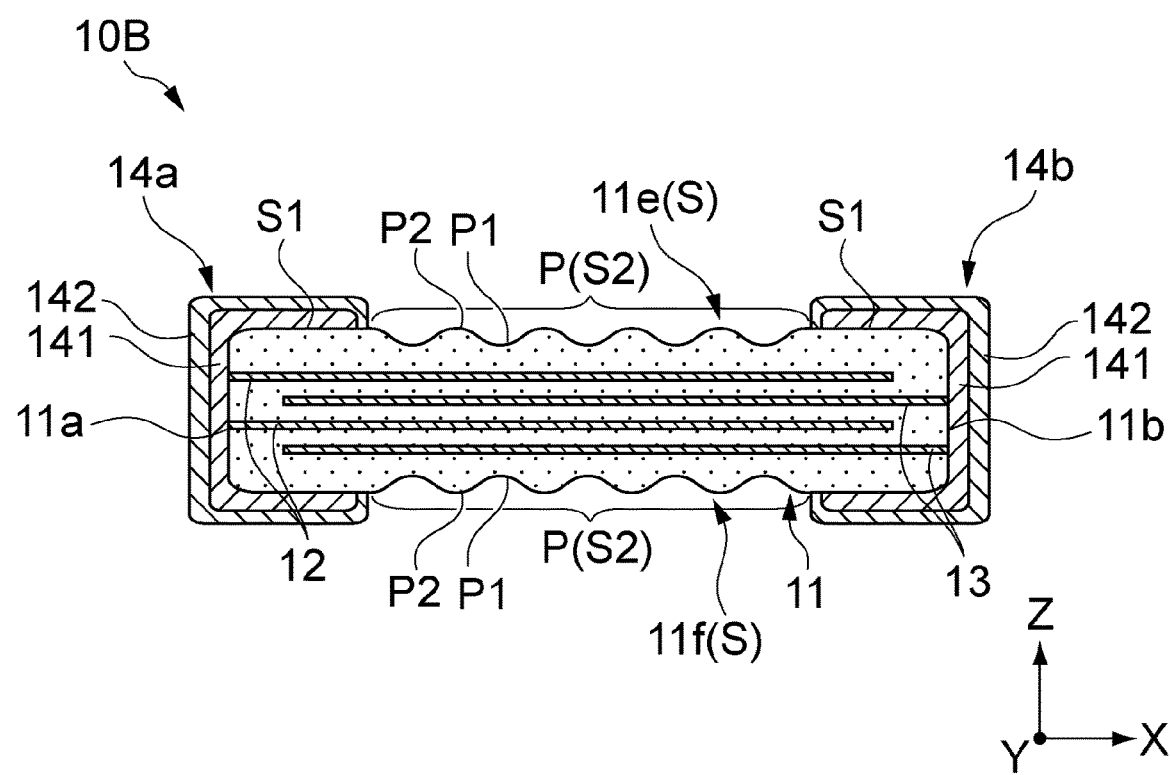
FIG. 17 illustrates a multilayer ceramic capacitor in accordance with a second embodiment, and is a cross-sectional view at a position corresponding to FIG. 2.

FIG. 17 illustrates a multilayer ceramic capacitor 10B in accordance with a second embodiment, and is a cross-sectional view at a position corresponding to FIG. 2. Hereinafter, components corresponding to those of the above-described embodiment are denoted by the same reference numerals, and description thereof will be omitted as appropriate.

As illustrated in FIG. 17, in the multilayer ceramic capacitor 10B of the present embodiment, the second principal surface 11f also has the uneven region P in addition to the first principal surface 11e. Although illustration is omitted, the side surfaces 11c and 11d may also have the uneven regions P as in the first embodiment.

Figure 18:
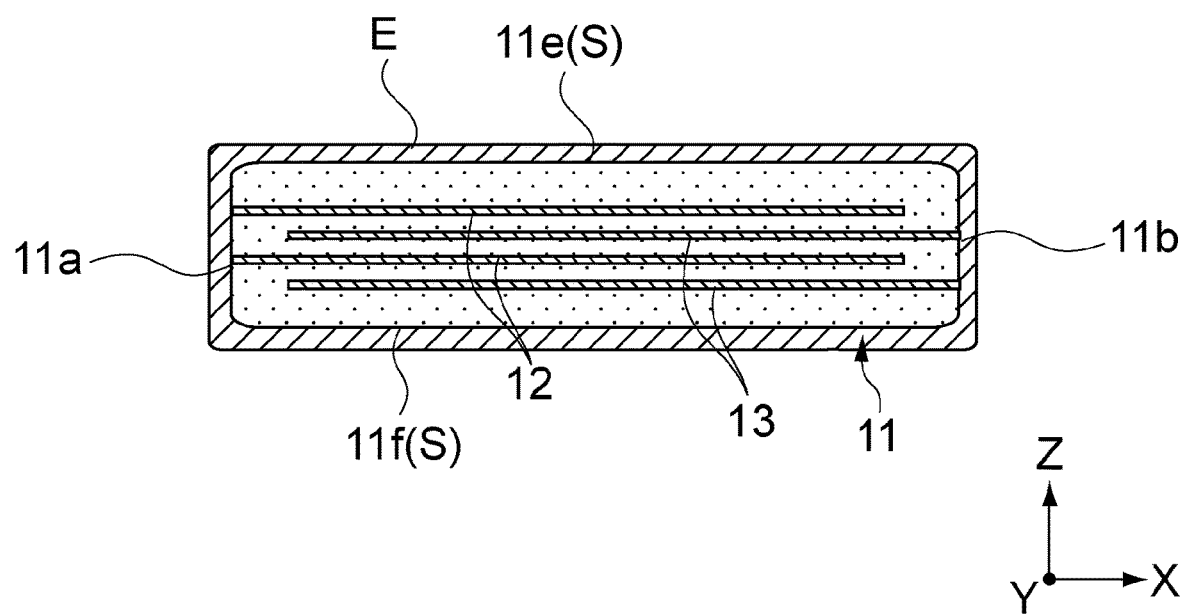
FIG. 18 is a cross-sectional view illustrating a manufacturing process of the multilayer ceramic capacitor and is a view for describing step S04.

As an example of the method of manufacturing the multilayer ceramic capacitor 10, as illustrated in FIG. 18, in step S04, the conductive thin films E are formed on the end surfaces 11a and 11b and the principal surfaces 11e and 11f. Then, in the step S05, the principal surfaces 11e and 11f are irradiated with a short-pulse laser to remove the conductive thin films E and form the uneven regions P.

In the present embodiment, the conductive thin films E may be formed on all six surfaces of the ceramic body 11 in step S04, and the principal surfaces 11e and 11f and the side surfaces 11c and 11d may be irradiated with the short-pulse laser in step S05.

In this configuration, since both the principal surfaces 11e and 11f have the uneven regions P, it is possible to effectively inhibit electrical connection between the external electrodes 14a and 14b on these surfaces. For example, when the multilayer ceramic capacitor 10B is mounted on the mounting substrate 110, dew condensation is likely to remain on the upper principal surface opposite from the mounting substrate 110. On the other hand, in the multilayer ceramic capacitor 10, even when either the first principal surface 11e or the second principal surface 11f is located at the upper side, both of the principal surfaces 11e and 11f have the uneven regions P, and thus it is possible to effectively inhibit the movement of the dew condensation generated on the principal surface at the upper side in the X-axis direction. Therefore, in the above-described configuration, the progress of migration between the external electrodes can be more reliably slowed down, and the reliability of the multilayer ceramic capacitor 10 can be improved.

Figure 19:
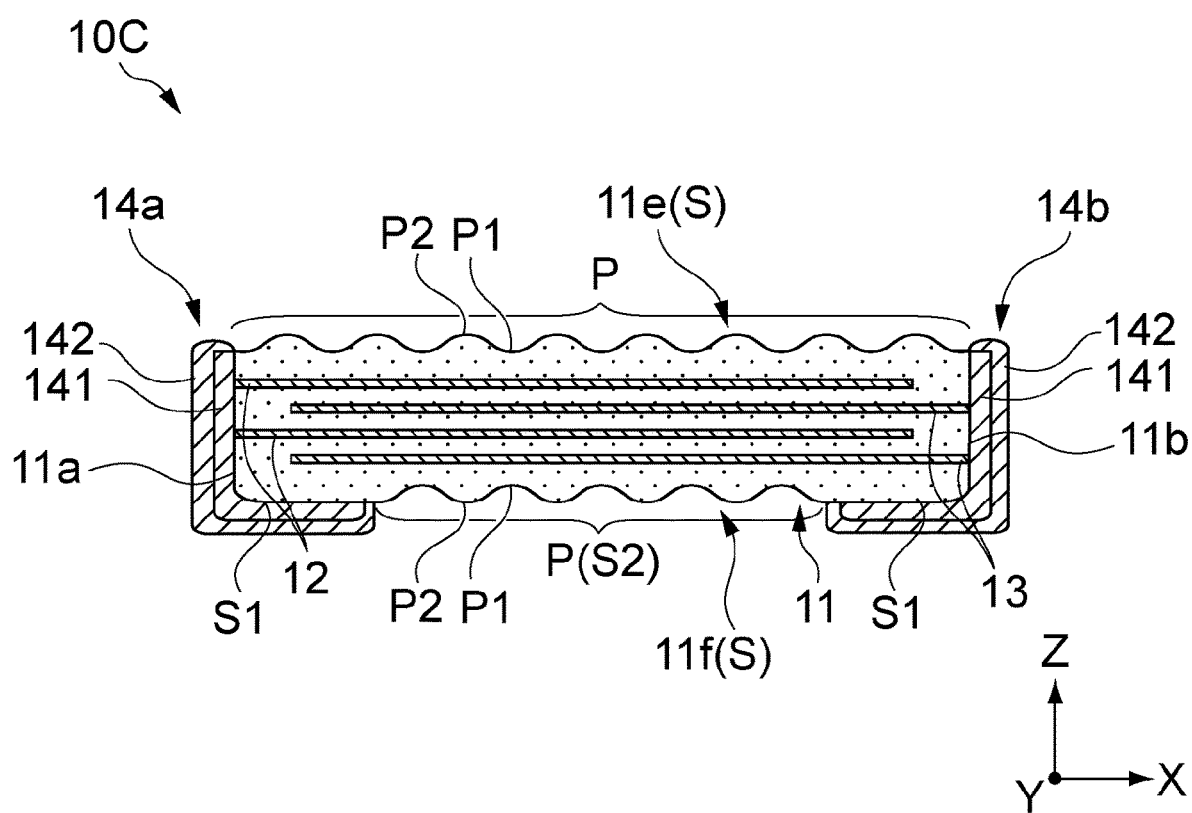
FIG. 19 illustrates a multilayer ceramic capacitor in accordance with a variation of the second embodiment, and is a cross-sectional view at a position corresponding to FIG. 2.

In the example illustrated in FIG. 17, each of the principal surfaces 11e and 11f has a pair of the electrode-forming regions S1 and the intermediate region S2, and the uneven region P is formed only in the intermediate region S2. Alternatively, as in a multilayer ceramic capacitor 10C illustrated in FIG. 19, the uneven region P may be formed on the entirety of at least one of the principal surfaces 11e and 11f in the same manner as the example illustrated in FIG. 16.

Third Embodiment

Figure 20:
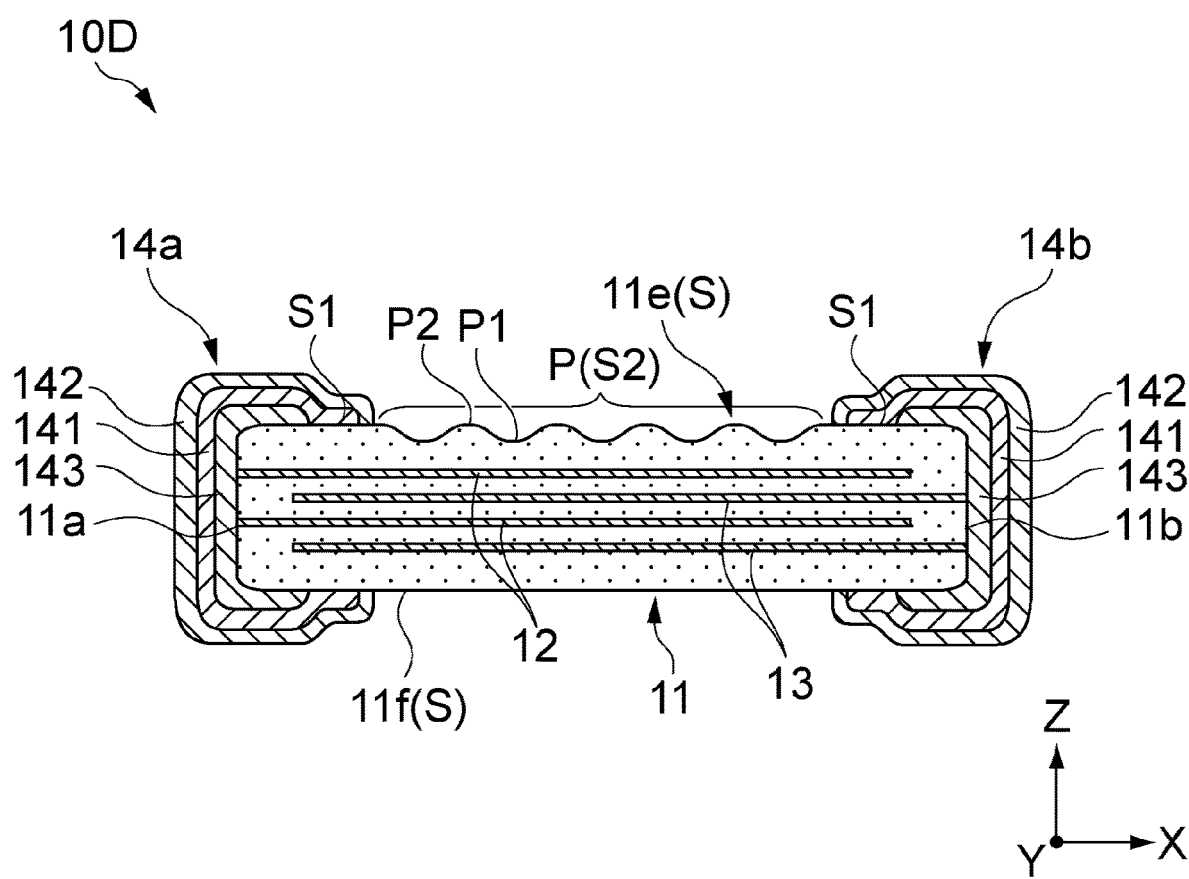
FIG. 20 illustrates a multilayer ceramic capacitor in accordance with a third embodiment, and is a cross-sectional view at a position corresponding to FIG. 2.

FIG. 20 illustrates a multilayer ceramic capacitor 10D in accordance with a third embodiment, and is a cross-sectional view at a position corresponding to FIG. 2.

As illustrated in FIG. 20, in the multilayer ceramic capacitor 10D of the present embodiment, the external electrodes 14a and 14b include two types of base films. Specifically, each of the external electrodes 14a and 14b includes a conductive sintered film 143 in addition to the conductive thin film 141 formed of the conductive thin film E and the plating film 142. The conductive sintered films 143 are formed on the respective end surfaces 11a and 11b, and are configured as films of baked conductive paste, for example.

Figure 21:
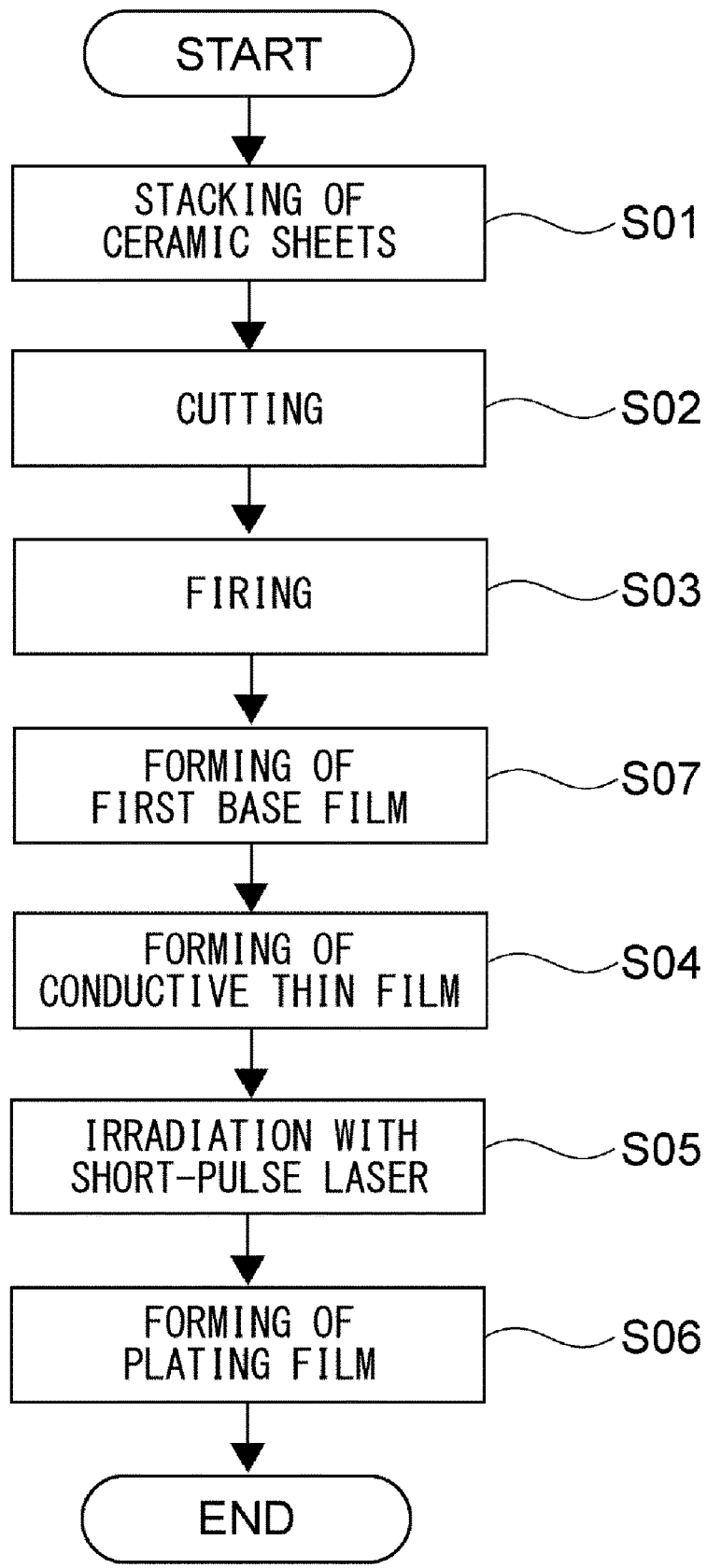
FIG. 21 is a flowchart illustrating a method of manufacturing the multilayer ceramic capacitor.

FIG. 21 is a flowchart illustrating a manufacturing method of the present embodiment. As illustrated in FIG. 21, the method of manufacturing the multilayer ceramic capacitor 10D of the present embodiment includes step S07 of forming a conductive sintered film before step S04 of forming a conductive thin film, in addition to steps S01 to S06 similar to those of the first embodiment.

In step S07, the conductive pastes for forming the conductive sintered films 143 are applied so as to cover the end surfaces 11a and 11b, respectively, and extend to part of the principal surfaces 11e and 11f and the side surfaces 11c and 11d, for example. The method of applying the conductive paste is not particularly limited, and a dipping method, a printing method, or the like can be selected as appropriate. Since the conductive sintered film 143 is formed thicker than the conductive thin film 141 and is hardly sublimated by the irradiation with the short-pulse laser, the conductive sintered film 143 is not formed in the region irradiated with the laser.

In step S04, the conductive thin film E is formed on the end surfaces 11a and 11b and the connection surface S including the first principal surface 11e, and is formed on the conductive sintered film 143. In step S05, as in the first embodiment, the conductive thin film E is irradiated with the short-pulse laser L to remove the conductive thin film E and form the uneven region P on the connection surface S including the first principal surface 11e.

The manufacturing method according to the present embodiment is not limited to the example illustrated in FIG. 21, and for example, the conductive paste for the conductive sintered film 143 may be applied before step S03, and the ceramic body 11 and the conductive sintered film 143 may be fired at the same time in step S03.

In the present embodiment, the conductive sintered films 143 are formed on the end surfaces 11a and 11b, so that the external electrodes 14a and 14b are more reliably connected to the internal electrodes 12 and 13. Also with this configuration, it is possible to effectively inhibit electrical connection between the external electrodes 14a and 14b by the uneven region P while suppressing problems caused by unevenness.

Figure 22:
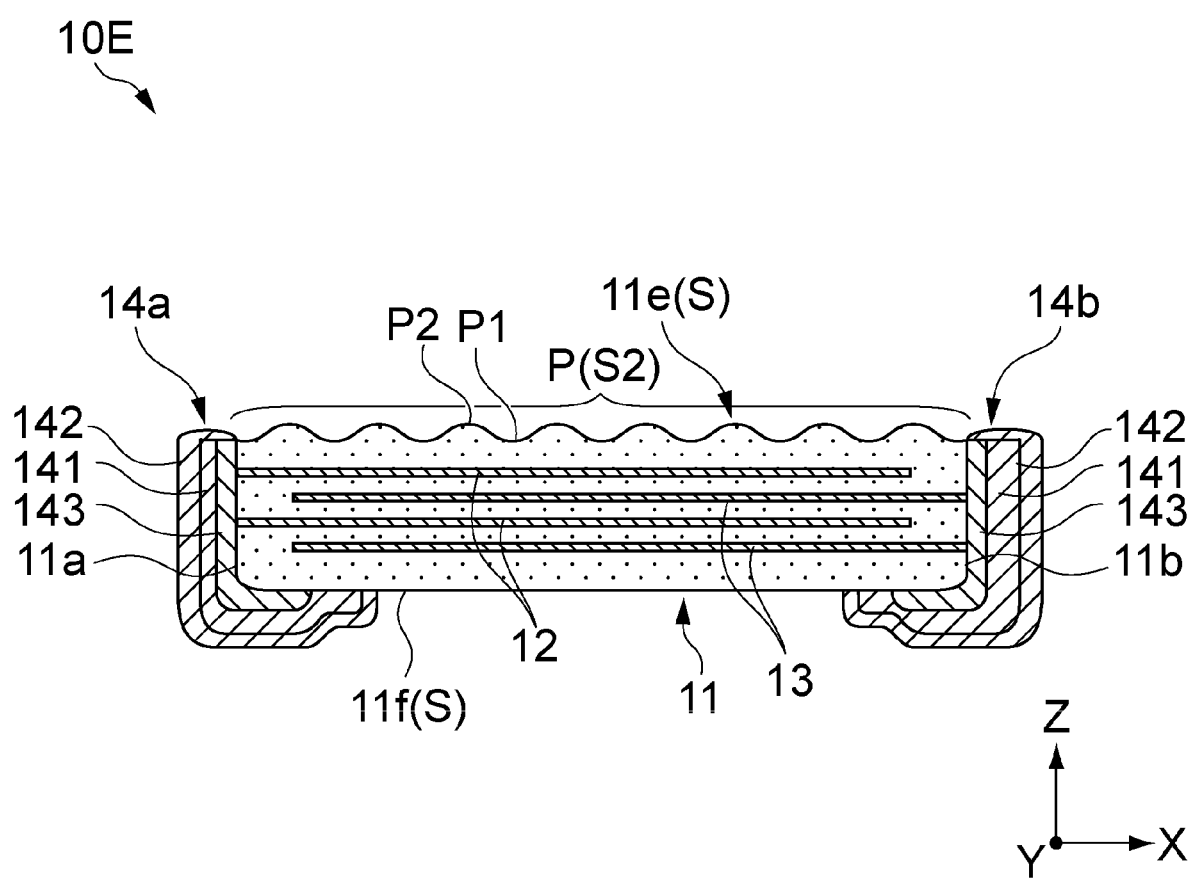
FIG. 22 illustrates a multilayer ceramic capacitor in accordance with a variation of the third embodiment, and is a cross-sectional view at a position corresponding to FIG. 2.
Figure 23:
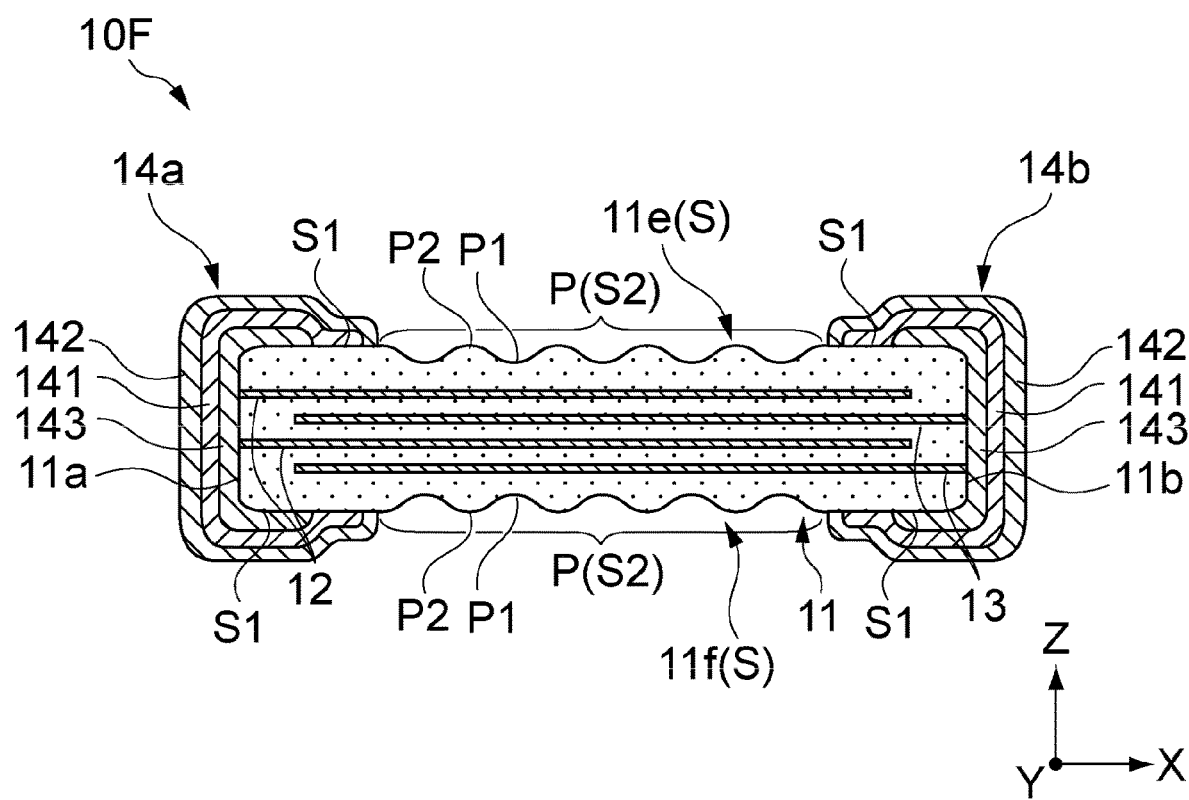
FIG. 23 illustrates a multilayer ceramic capacitor in accordance with another variation of the third embodiment, and is a cross-sectional view at a position corresponding to FIG. 2.
Figure 24:
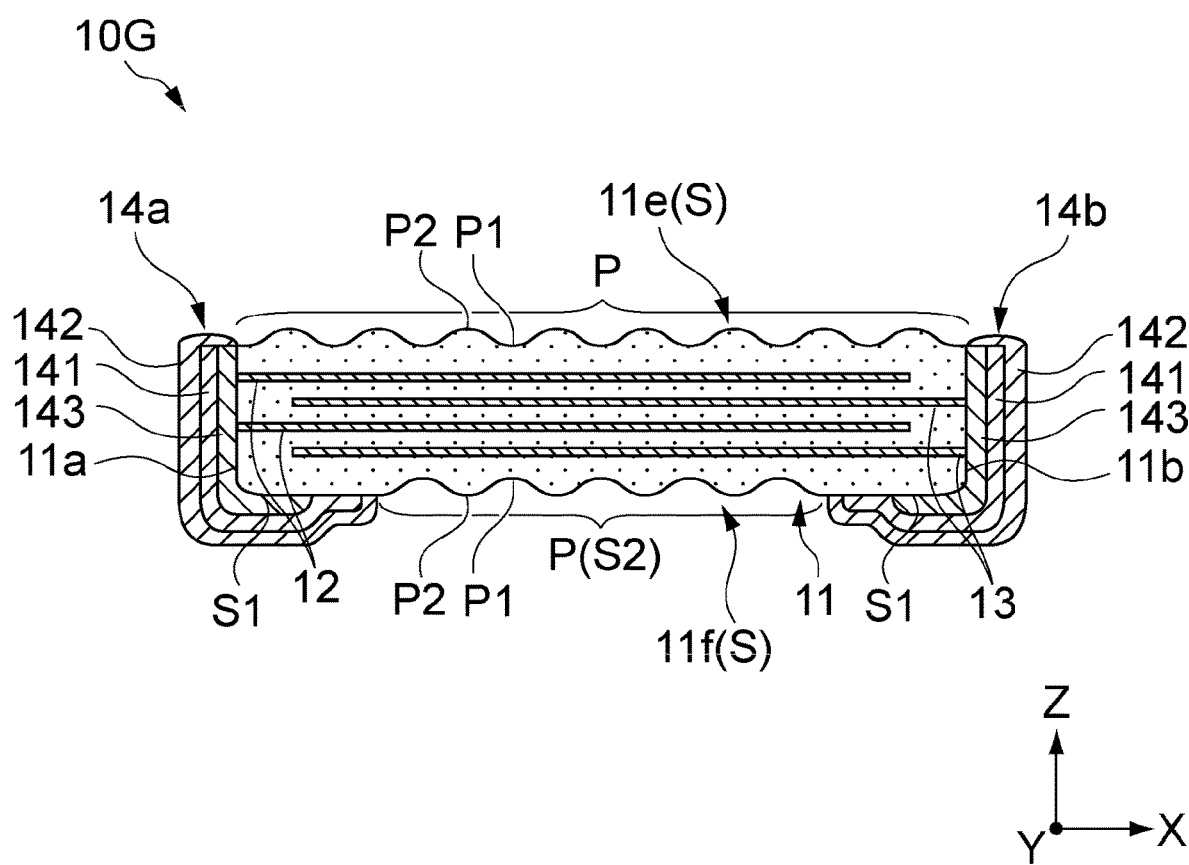
FIG. 24 illustrates a multilayer ceramic capacitor in accordance with another variation of the third embodiment, and is a cross-sectional view at a position corresponding to FIG. 2.

FIG. 22 to FIG. 24 illustrate multilayer ceramic capacitors 10E, 10F, and 10G in accordance with variations of the present embodiment, respectively, and are cross-sectional views at positions corresponding to FIG. 2.

As illustrated in FIG. 22, in the multilayer ceramic capacitor 10E, the uneven region P may be formed across the entire first principal surface 11e as in the variation of the first embodiment (FIG. 16).

Alternatively, as illustrated in FIG. 23, in the multilayer ceramic capacitor 10F, in addition to the first principal surface 11e, the second principal surface 11f may also have the uneven region P as in the second embodiment (FIG. 17).

Alternatively, as illustrated in FIG. 24, in the multilayer ceramic capacitor 10G, the uneven region P may be formed across the entirety of at least one of the principal surfaces 11e and 11f as in the variation (FIG. 19) of the second embodiment.

Fourth Embodiment

In the above-described embodiments, an example in which the recess portions P1 are formed along the Y-axis direction has been described, but this does not intend to suggest any limitation, and the recess portions P1 are only required to be formed along a direction intersecting the X-axis direction.

Figure 25:
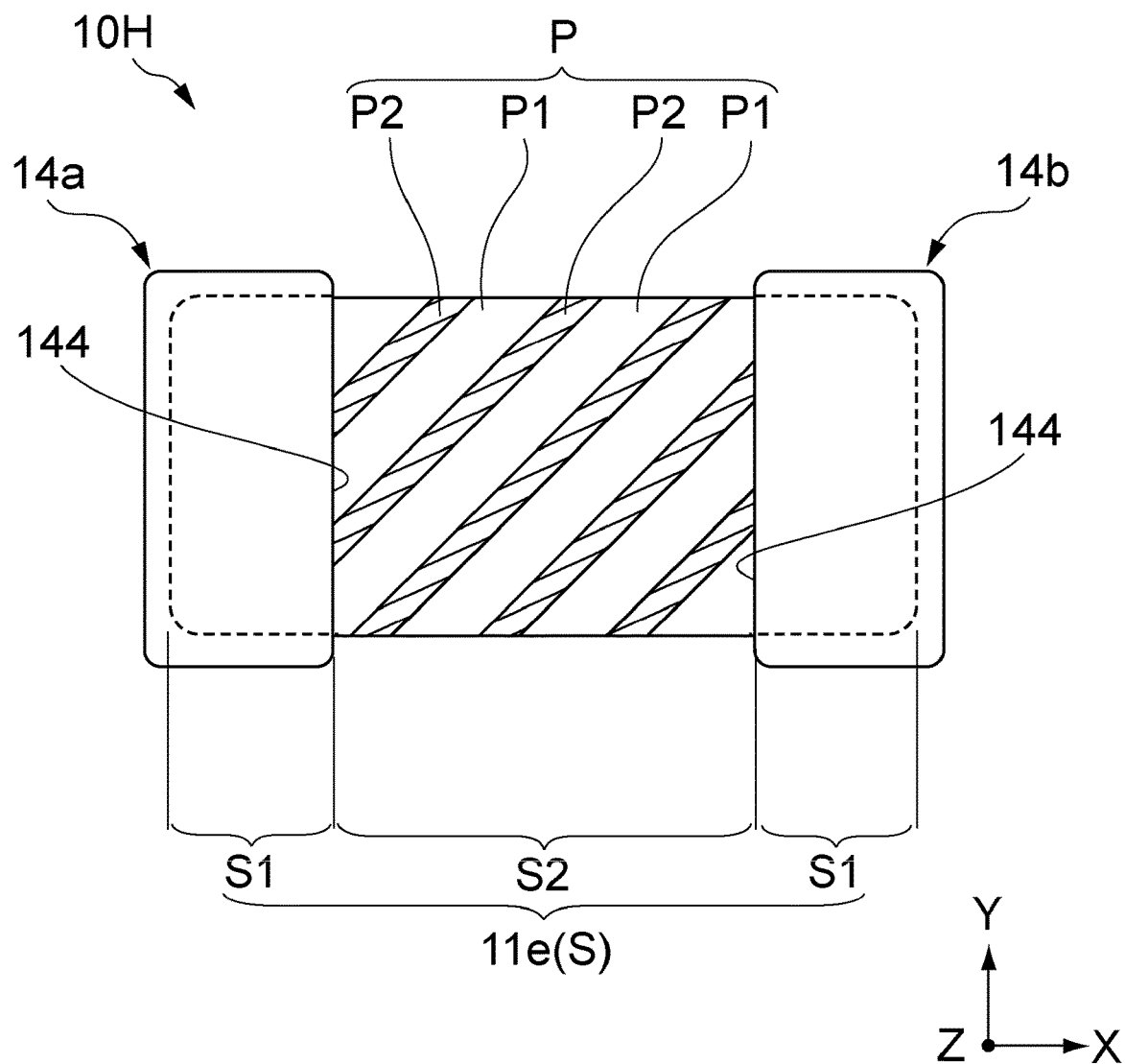
FIG. 25 is a top view (plan view) of a multilayer ceramic capacitor in accordance with a fourth embodiment.

FIG. 25 is a top view (a plan view) illustrating a multilayer ceramic capacitor 10H of the fourth embodiment and is a view illustrating the first principal surface 11e.

As illustrated in FIG. 25, in the multilayer ceramic capacitor 10H, the recess portion P1 of the uneven region P is formed along the extension direction intersecting the X-axis at an acute angle. Also with this configuration, it is possible to increase the length of the contour of the first principal surface 11e in the X-Z cross section between the external electrodes 14a and 14b, and to inhibit electrical connection between the external electrodes 14a and 14b.

Further, in this configuration, inner edge portions 144 of the external electrodes 14a and 14b facing the uneven region P are in contact with the recess portion P1 and the protrusion portion P2. In general, stress is likely to be generated in a portion of the ceramic body 11 in contact with the inner edge portion 144 because of distortion or the like of the substrate after mounting, and a crack is likely to develop along the inner edge portion 144. On the other hand, in the above-described configuration, since the recess portion P1 and the protrusion portion P2 are in contact with the inner edge portion 144, a crack is less likely to develop along the inner edge portion 144. Therefore, it is possible to inhibit the development of cracks more effectively in the ceramic body 11 and the resulting decrease in insulation resistance.

OTHER EMBODIMENTS

Although the embodiments of the present invention have been described above, the present invention is not limited to the above-described embodiments, and various modifications can be made without departing from the scope of the present invention. For example, the embodiment of the present invention can be an embodiment obtained by combining the respective embodiments.

In the above-described embodiment, an example in which the short-pulse laser is repeatedly scanned along the parallel direction has been described. However, after the short-pulse laser is repeatedly scanned along the parallel direction, the pulse laser may be repeatedly scanned along a direction intersecting the parallel direction on the surface after the scanning. As a result, the recess portions along the direction in which scanning is performed later are also formed, and the conductive thin film can be more reliably prevented from remaining in the uneven region.

In the above-described embodiment, an example in which the uneven region is formed by scanning with the short-pulse laser has been described. However, the method of forming the uneven region is not limited thereto.

The above embodiments are applicable not only to multilayer ceramic capacitors but also to general multilayer ceramic electronic components each including a ceramic body and first and second external electrodes. Examples of the multilayer ceramic electronic component to which the above embodiments are applicable include chip varistors, chip thermistors, and multilayer inductors, in addition to multilayer ceramic capacitors.

The multilayer ceramic electronic components of the embodiments are not limited to the configuration in which the dimension in the X-axis direction is larger than the dimension in the Y-axis direction, and may have a configuration in which the dimension in the Y-axis direction is larger than the dimension in the X-axis direction. Further, the dimension in the X-axis direction may be the same as the dimension in the Y-axis direction.

The multilayer ceramic electronic components of the present embodiments are not limited to a two-terminal-type multilayer ceramic electronic components including two external electrodes, and may be a multi-terminal-type multilayer ceramic electronic components including three or more external electrodes. In this case, a direction in which the external electrodes having different polarities face each other is defined as a second axis direction, and a surface of the ceramic body disposed between the external electrodes is defined as a connection surface. When there are a plurality of directions in which external electrodes having different polarities face each other, one of the directions is defined as the second axis direction. The connection surface has the uneven region that includes a plurality of recess portions formed along an extension direction intersecting the second axis, recessed in a depth direction orthogonal to the second axis and the extension direction, and arranged along an arrangement direction orthogonal to the depth direction and the extension direction, and a plurality of protrusion portions disposed between the plurality of recess portions, and has the above depth and the above arrangement pitch. This also effectively inhibit electrical connection between the external electrodes having different polarities, thereby improving reliability.

What is claimed is:

1. A multilayer ceramic electronic component comprising:
a ceramic body that includes a plurality of internal electrodes stacked in a direction of a first axis with ceramic layers interposed therebetween, and has a rectangular parallelepiped shape having first and second end surfaces perpendicular to a second axis orthogonal to the direction of the first axis, and four connection surfaces each connecting the first and second end surfaces and extending along a direction of the second axis, the plurality of internal electrodes being alternately led out to the first and second end surfaces; and
first and second external electrodes disposed on the first and second end surfaces, respectively, and opposed to each other in the direction of the second axis,
wherein at least one connection surface of the connection surfaces has an uneven region located between the first and second external electrodes,
wherein the uneven region includes:
a plurality of recess portions that are formed along an extension direction intersecting the second axis, recessed in a depth direction orthogonal to the second axis and the extension direction, and arranged along an arrangement direction orthogonal to the depth direction and the extension direction, and
a protrusion portion disposed between the plurality of recess portions,
wherein a depth of each of the recess portions in the depth direction is 0.1 µm or greater and less than 2.5 µm, and
wherein an arrangement pitch of the recess portions along the arrangement direction is 1 µm or greater and 80 µm or less,
wherein a ratio of the arrangement pitch of the recess portions to the depth of each of the recess portions is 0.41 or greater and 700 or less.

2. The multilayer ceramic electronic component according to claim 1, wherein the ratio of the arrangement pitch of the recess portions to the depth of each of the recess portions is 2.5 or greater and 80 or less.

3. The multilayer ceramic electronic component according to claim 1, wherein a dimension in the direction of the first axis of the multilayer ceramic electronic component is 110 µm or less.

4. The multilayer ceramic electronic component according to claim 1, wherein at least one of the at least one connection surface having the uneven region extends along the direction of the second axis and a third axis direction orthogonal to the first axis and the second axis.

5. The multilayer ceramic electronic component according to claim 1,
wherein at least one of the at least one connection surface having the uneven region includes a pair of electrode-forming regions covered with the first and second external electrodes, and an intermediate region between the pair of electrode-forming regions, and
wherein the uneven region is formed only in the intermediate region.

6. The multilayer ceramic electronic component according to claim 1, wherein each of the first and second external electrodes includes a conductive thin film, and a plating film formed on the conductive thin film.

7. The multilayer ceramic electronic component according to claim 6, wherein the conductive thin film has a thickness of 1.0 µm or less.

8. The multilayer ceramic electronic component according to claim 6, wherein the conductive thin film is formed of a sputtered film.

9. The multilayer ceramic electronic component according to claim 1, wherein the extension direction of each of the recess portions is a direction orthogonal to the second axis.

10. The multilayer ceramic electronic component according to claim 1, wherein the extension direction of each of the recess portions is a direction intersecting with the second axis at an acute angle.

11. The multilayer ceramic electronic component according to claim 1, wherein an arithmetic average height Sa of each of the recess portions and the protrusion portion is 1.0 µm or less.

12. The multilayer ceramic electronic component according to claim 1, wherein a maximum height Sz of each of the recess portions and the protrusion portion is 5.0 µm or less.

13. The multilayer ceramic electronic component according to claim 1, wherein an absolute value of a difference between an arithmetic average height Sa of each of the recess portions and an arithmetic average height Sa of the protrusion portion is 0.06 μm or less.

14. The multilayer ceramic electronic component according to claim 1, wherein an absolute value of a difference between a maximum height Sz of each of the recess portions and a maximum height Sz of the protrusion portion is 4.0 μm or less.

15. A circuit board comprising:
a multilayer ceramic electronic component; and
a mounting substrate on which the multilayer ceramic electronic component is mounted,
wherein the multilayer ceramic electronic component includes:
 a ceramic body that includes a plurality of internal electrodes stacked in a direction of a first axis with ceramic layers interposed therebetween, and has a rectangular parallelepiped shape having first and second end surfaces perpendicular to a second axis orthogonal to the direction of the first axis, and four connection surfaces each connecting the first and second end surfaces and extending along a direction of the second axis, the plurality of internal electrodes being alternately led out to the first and second end surfaces, and
 first and second external electrodes disposed on the first and second end surfaces, respectively, and opposed to each other in the direction of the second axis,
wherein at least one connection surface of the connection surfaces has an uneven region located between the first and second external electrodes,
wherein the uneven region includes:
 a plurality of recess portions that are formed along an extension direction intersecting the second axis, recessed in a depth direction orthogonal to the second axis and the extension direction, and arranged along an arrangement direction orthogonal to the depth direction and the extension direction, and
 a protrusion portion disposed between the plurality of recess portions,
wherein a depth of each of the recess portions in the depth direction is 0.1 μm or greater and less than 2.5 μm, and
wherein an arrangement pitch of the recess portions along the arrangement direction is 1 μm or greater and 80 μm or less,
wherein a ratio of the arrangement pitch of the recess portions to the depth of each of the recess portions is 0.41 or greater and 700 or less.

* * * * *